(12) United States Patent
Lee et al.

(10) Patent No.: US 10,681,769 B2
(45) Date of Patent: *Jun. 9, 2020

(54) METHOD AND APPARATUS FOR SELECTING RECEPTION ANTENNA SET OF USER TERMINAL

(71) Applicant: Samsung Electronics Co., Ltd., Suwon-si, Gyeonggi-do (KR)

(72) Inventors: Hyoungjoo Lee, Suwon-si (KR); Kee Hoon Kim, Seoul (KR); Byung Gil Lee, Hwaseong-si (KR); Chaiman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,729

(22) Filed: Mar. 11, 2019

(65) Prior Publication Data
US 2019/0208569 A1 Jul. 4, 2019

Related U.S. Application Data

(63) Continuation of application No. 15/436,720, filed on Feb. 17, 2017, now Pat. No. 10,231,280.

(30) Foreign Application Priority Data

Feb. 19, 2016 (KR) .......................... 10-2016-0019601

(51) Int. Cl.
*H04B 7/08* (2006.01)
*H04W 72/04* (2009.01)
(Continued)

(52) U.S. Cl.
CPC .............. *H04W 76/27* (2018.02); *H04B 7/04* (2013.01); *H04B 7/0802* (2013.01);
(Continued)

(58) Field of Classification Search
CPC ... H04W 76/27; H04W 72/042; H04W 24/08; H04W 76/28; H04B 7/0802; H04B 7/0874; H04B 7/0825; H04B 7/0817; H04B 7/04

See application file for complete search history.

(56) References Cited

U.S. PATENT DOCUMENTS 10,231,280 B2 * 3/2019 Lee ..................... H04W 76/28
2010/0222075 A1 9/2010 Miura
(Continued)

FOREIGN PATENT DOCUMENTS

CN 102856645 A 1/2013

OTHER PUBLICATIONS

NTT Docomo, "Views on legacy 2Rx test for 4Rx capable UE", 3GPP TSG RAN WG4 Meeting #76bis, Oct. 12-16, 2015, 3 pages, R4-156129.

(Continued)

*Primary Examiner* — Mohamed A Kamara

(57) ABSTRACT

An electronic device is provided. The electronic device includes a plurality of antennas, a radio frequency (RF) circuit configured to electrically connect with the plurality of antennas, and a processor. The plurality of antennas include a first main antenna, a first sub-antenna, a second main antenna, and a second sub-antenna. The processor controls the RF circuit to operate in a first mode of receiving a signal using the first main antenna and the first sub-antenna. The processor controls the RF circuit to operate in a second mode different from the first mode to receive the signal based on a signal state.

20 Claims, 18 Drawing Sheets

(51) Int. Cl.
*H04W 76/27* (2018.01)
*H04B 7/04* (2017.01)
*H04W 76/28* (2018.01)
*H04W 24/08* (2009.01)

(52) U.S. Cl.
CPC ......... *H04B 7/0817* (2013.01); *H04B 7/0825* (2013.01); *H04B 7/0874* (2013.01); *H04W 24/08* (2013.01); *H04W 72/042* (2013.01); *H04W 76/28* (2018.02)

(56) References Cited

U.S. PATENT DOCUMENTS

| 2012/0039324 A1* | 2/2012 | Trachewsky | H04B 7/04 |
| | | | 370/338 |
| 2012/0257523 A1 | 10/2012 | Kasturi et al. | |
| 2015/0365894 A1 | 12/2015 | Bai et al. | |
| 2016/0065295 A1* | 3/2016 | Stanescu | H04B 17/29 |
| | | | 375/133 |

OTHER PUBLICATIONS

Communication pursuant to Rule 164(1) EPC dated Apr. 4, 2019 in connection with European Patent Application No. 17 75 3530, 9 pages.
European Patent Office, "Supplementary European Search Report," Application No. EP17753530.9, dated Aug. 14, 2019, 16 pages.

* cited by examiner

METHOD AND APPARATUS FOR SELECTING RECEPTION ANTENNA SET OF USER TERMINAL

CROSS-REFERENCE TO RELATED APPLICATIONS

The present application is a continuation of application Ser. No. 15/436,720, filed Feb. 17, 2017, which claims priority to Korean Application No. 10-2016-0019601, filed Feb. 19, 2016, the entire disclosures of which are hereby incorporated by reference.

TECHNICAL FIELD

The present disclosure relates to technologies of using antennas based on a variety of communication environments of a terminal.

BACKGROUND

With the development of communication technologies, a user terminal may mount a plurality of antennas. For example, the user terminal may include a main antenna used to transmit and receive a signal and a diversity antenna only used to receive a signal. The user terminal may increase reception performance of a specific frequency band by synthesizing the signal received via the main antenna and the signal received via the diversity antenna using its radio frequency integrated circuit (RFIC) and the like.

If the user terminal is located a region, such as a very weak electric field, when much packet loss occurs because signal quality or strength is very weak, although it receives a signal using the conventional main antenna and the conventional diversity antenna, it is difficult to greatly enhance reception performance. Further, the user terminal may be in several communication environments such as a very weak electric field, a middle weak electric field, and a strong electric field and may be in a radio resource control (RRC) connected state or an RRC idle state for a base station. Conventional antenna use schemes do not efficiently correspond to an overall network environment in which the user terminal is located in reception performance or power consumption.

SUMMARY

To address the above-discussed deficiencies, it is a primary object to provide a method for allowing a user terminal to select an antenna set for signal reception in various communication environments and a user terminal therefor.

In accordance with an aspect of the present disclosure, an electronic device is provided. The electronic device may include a plurality of antennas, a radio frequency (RF) circuit configured to electrically connect with the plurality of antennas, and a processor. The plurality of antennas may include a first main antenna configured to transmit or receive a signal of a first frequency band, a first sub-antenna configured to receive the signal of the first frequency band, a second main antenna, and a second sub-antenna. The processor may be configured to control the RF circuit to operate in a first mode of receiving the signal of the first frequency band using the first main antenna and the first sub-antenna. The processor may be configured to determine a signal state based on a parameter indicating signal strength or signal quality and control the RF circuit to operate in a second mode of receiving the signal of the first frequency band using the first main antenna, the first sub-antenna, the second main antenna, and the second sub-antenna based on the determined signal state.

In accordance with another aspect of the present disclosure, an antenna operation method of an electronic device having a plurality of antennas is provided. The method may include determining a signal state based on a parameter indicating signal strength or signal quality, determining an RRC state of the electronic device for a base station, and determining an antenna to be used to receive a signal among the plurality of antennas based on the signal state and the RRC state.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1A:
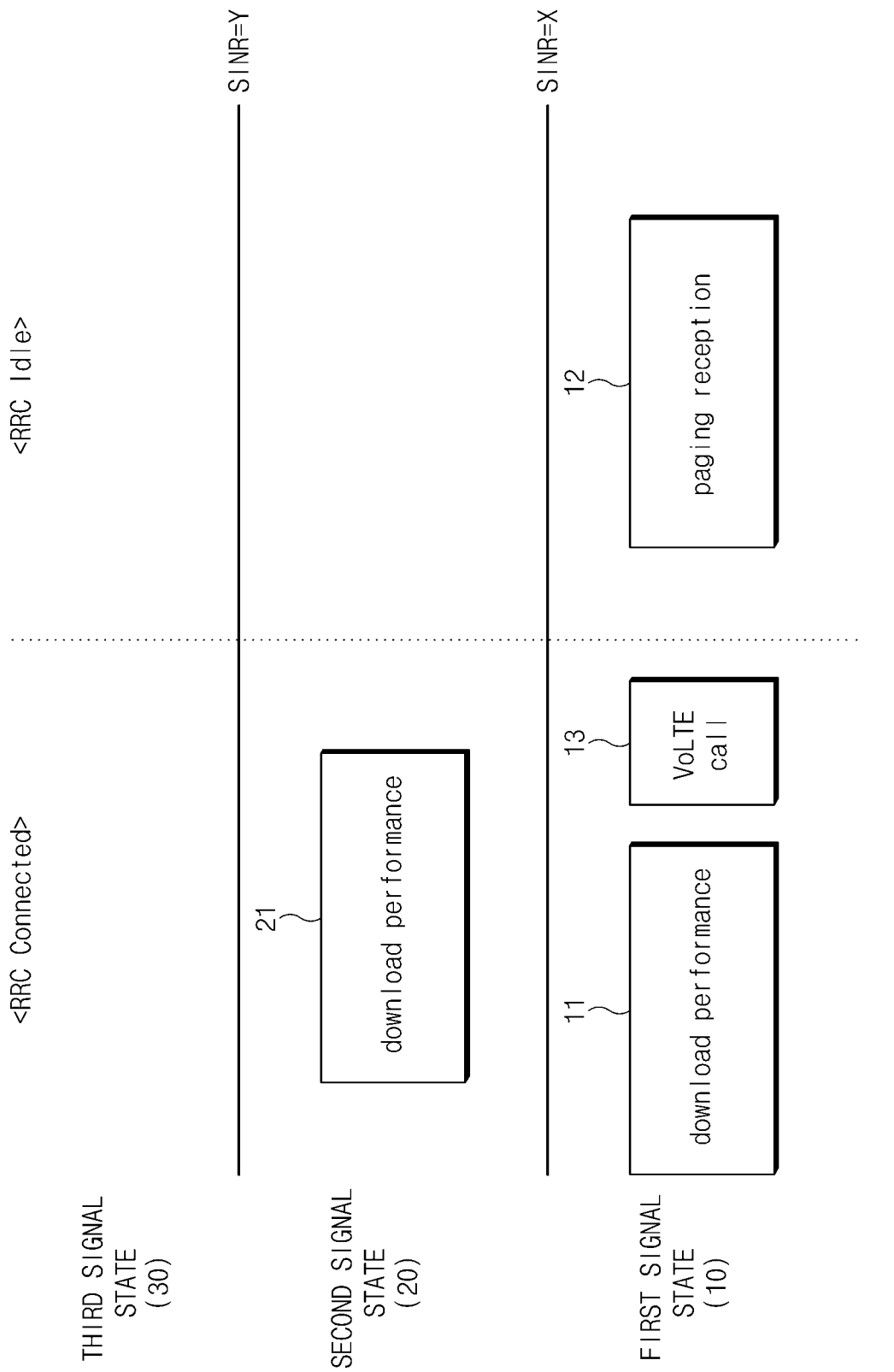
FIG. 1A illustrates a change in a communication environment of a user terminal and an operation performed in each communication environment by a user terminal, according to an embodiment.

FIGS. 1A through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the present disclosure is described with reference to the accompanying drawings. Various modifications are possible in various embodiments of the present disclosure and embodiments are illustrated in drawings and related detailed descriptions are listed. However, the present disclosure is not intended to be limited to the specific embodiments, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Acronyms and/or abbreviations used herein are defined hereinafter. In addition, a variety of acronyms and/or abbreviations may be defined in the present disclosure.

Tx—transmission
Rx—reception
DRX—Discontinuous reception
RF—Radio Frequency
LTE—Long Term Evolution
VoLTE—Voice over LTE
MCS—Modulation and Coding Scheme SINR—Signal to Interference plus Noise Ratio
CQI—Channel Quality Indicator
DCI—Downlink Control Information
PDCCH—Physical Downlink Control CHannel
PDSCH—Physical Downlink Shared Channel
CA—Carrier Aggregation
RRC—Radio Resource Control
RSSI—Received Signal Strength Indicator
RSRP—Reference Signal Received Power
ECIO (Ec/Io)—Energy to Interference Ratio
RSRQ—Reference Signal Received Quality
UE—User Equipment Hereinafter, a description will be given of an electronic device according to various embodiments with reference to the accompanying drawings. In the present disclosure, the electronic device may be referred to as a user terminal, a UE, or the like.

FIG. 1A is a drawing illustrating a change in a communication environment of a user terminal and an operation performed in each communication environment by a user terminal, according to an embodiment.

Referring to FIG. 1A, the user terminal may be in a variety of signal states. For example, the signal state may be classified into three stages according to signal strength or signal quality. For example, a communication environment of the user terminal may correspond to any one of a first signal state 10, a second signal state 20, and a third signal state 30. The signal state 10 may correspond to a state where signal strength or quality is relatively very weak, that is, a state where a network environment is very poor. The second signal state 20 may correspond to a state where a network environment is fair or good, between the first signal state 10 and the third signal state 30. The third signal state 30 may correspond to a state where a network environment is excellent.

In an example of FIG. 1A, the first signal state 10 may correspond to a state where an SINR value is less than an X dB. For example, the user terminal may determine an SINR value based on a signal received via its antenna. If the determined SINR value is less than the X dB, the user terminal may determine that a network environment where the user terminal is currently located is in the first signal state 10.

Further, if an SINR value is between the X dB and a Y dB, the user terminal may determine that a current network environment is in the second signal state 20. Also, if an SINR value is greater than the Y dB, the user terminal may determine that its network environment corresponds to the third signal state 30. The X dB and the Y dB which are the SINR values may be determined in various manners based on a type of the user terminal, a communication environment, and the like. In general, the X dB may be set to a reference value of determining a state where a signal state is relatively poor and normal, and the Y dB may be set to a reference value of determining a state where a signal state is relatively normal and fair or good.

Figure 1B:
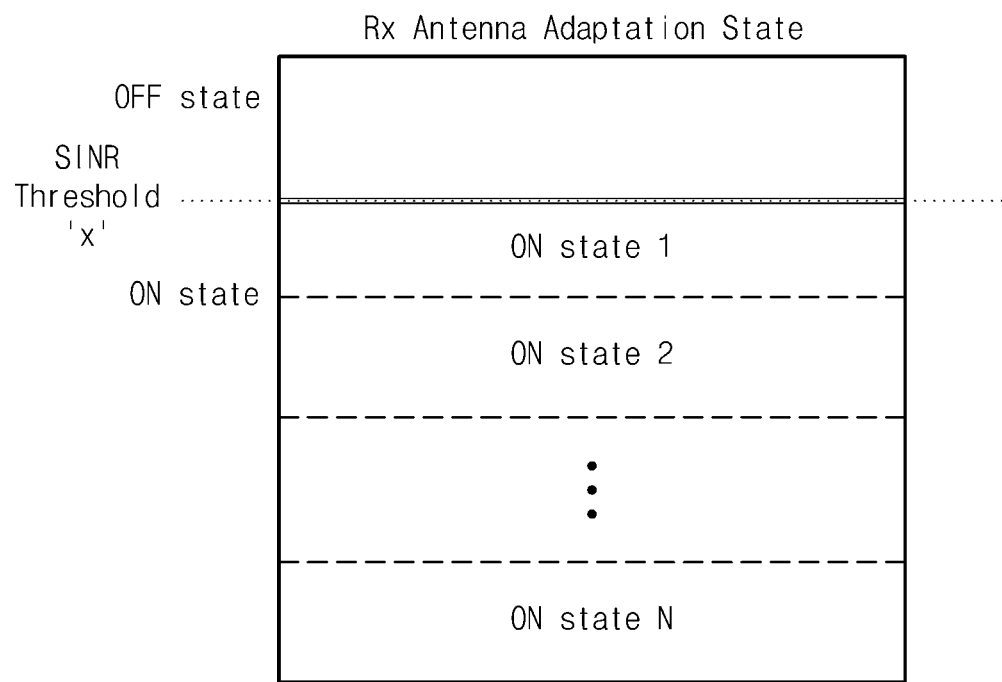
FIG. 1B illustrates classification of a communication environment of a user terminal according to another embodiment.

FIG. 1B is a drawing illustrating classification of a communication environment of a user terminal according to another embodiment.

Referring to FIG. 1B, the user terminal may determine an ON/OFF state of an Rx antenna adaptive control operation according to an embodiment relative to an SINR value 'x'. Also, a plurality of detailed states (an ON state 1, an ON state 2, ..., an ON state N) may be defined in an ON state of a 4RxD operation. Other threshold values or another operation conditions may be set based on each of the plurality of defined states.

The user terminal may determine a current signal state using a parameter, such as an RSRP, an Ec/IO, or an RSRQ rather than an SINR, indicating signal strength or quality. Hereinafter, a description will be given of various embodiments about an SINR for convenience of description.

Figure 1C:
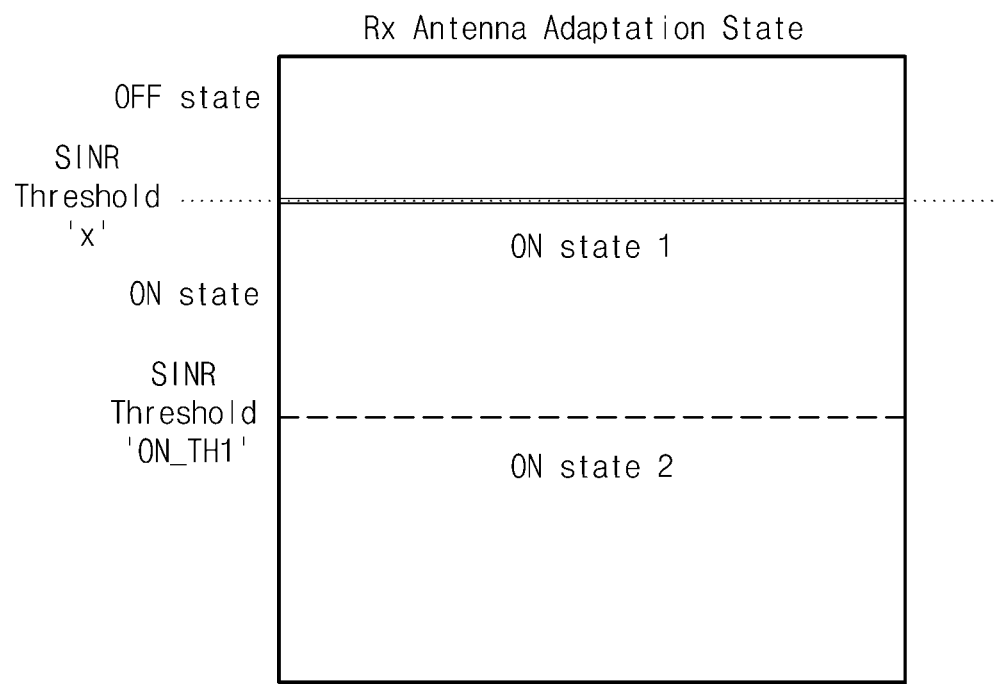
FIG. 1C illustrates classification of a communication environment of a user terminal according to another embodiment.

Classification of signal states shown in FIG. 1A may be normalized like FIG. 1C. For example, a signal state a user terminal may have may be classified as an ON state or an OFF state about an SINR value 'x'. The ON state may be classified as an ON state 1 or an ON state 2 about 'ON_TH1'. In an embodiment, the ON state 1 may correspond to a middle weak electric field, and the ON state 2 may correspond to a very weak electric field. The user terminal may perform Rx antenna adaptive control based on different conditions according to each state.

Referring again to FIG. 1A, the user terminal may be roughly in three states about an SINR value. For example, the user terminal may be in a weak electric field (e.g., a low SINR region), a middle electric field (e.g., a middle SINR region), or a strong electric field (e.g., a high SINR region). Alternatively, the user terminal may be in a very electric field (e.g., a very low SINR region), a middle weak electric field (e.g., a middle/low SINR region), or a strong electric field (e.g., a high SINR region). In general, a communication environment where the user terminal is located may be in any one of a first signal state 10 where an SINR value is lower than a first reference value (e.g., an X dB), a third signal state 30 where the SINR value is higher than a second reference value (e.g., a Y dB), and a second signal state 20 where the SINR value is between the first reference value and the second reference value. As described with reference to FIGS. 1B and 1C, an Rx antenna adaption operation according to an embodiment may be subdivided into four or more states (e.g., an OFF state, an ON state 1, an ON state 2, an ON state 3, and the like).

The description is given of the very weak electric field, the middle weak electric field, and the strong electric field for convenience of description in various embodiments of the present disclosure. However, each communication environment may be replaced with the first signal state 10 or the ON state 2, the second signal state 20 or the ON state 1, or the third signal state 30 or the OFF state based on relative signal quality/strength.

In connection with a state where the user terminal communicates with a base station, the user terminal may be in any one of an RRC connected state or an RRC idle state. In various embodiments, the user terminal may operate in a different way based on its RRC state or its communication environment (signal state). For example, the user terminal may receive a signal using a main antenna for transmitting/receiving a signal and a diversity antenna for reinforcing the signal received by the main antenna. For the user terminal to receive a signal using two antennas (e.g., a main antenna and a diversity antenna) may be defined as a 2 Rx Diversity (2RxD) operation. For the user terminal to receive a signal using, for example, a first (main) antenna and a first diversity antenna, and a second (main) antenna and a second diversity antenna may be defined as a 4RxD operation. For example, the first antenna may transmit and receive a signal, and the first diversity antenna, the second antenna, and the second diversity antenna may receive a signal. If maintain antenna switching occurs in a 4RxD ON state, the second antenna may transmit and receive a signal, and the other three antennas may receive a signal. Similarly, for the user terminal to receive a signal using the three antennas (e.g., the first antenna, the first diversity antenna, and the second diversity antenna) may be defined as a 3RxD operation. To receive a signal by the 2RxD operation or the 4RxD operation or by the 3RxD operation, the four antennas included in the user terminal may be implemented to receive a signal of a frequency band corresponding to the signal in common.

In an embodiment, if a communication environment corresponds to the second signal state 20 in an RRC connected state, the user terminal may operate the 4RxD operation to increase download performance. For example, a 4RxD function may be activated while a download of meeting a condition is performed.

In an embodiment, if a communication environment corresponds to the first signal state 10 in the RRC connected state, the user terminal may operate the 4RxD operation for a VoLTE service, a third generation (3G) voice call service, or a voice over Internet protocol (VoIP) service other than increasing download performance. In the present disclosure, an embodiment is exemplified as VoLTE. However, the user terminal may perform an Rx antenna adaptation operation according to an embodiment for a variety of call types which may enhance stability of a voice call as a 4RxD operation is performed. Also, the user terminal may first consider a voice call state as compared with a data Rx state as a condition (e.g., a triggering point) for executing an Rx antenna adaptation operation. For example, considering a data Rx state, if a voice call service is being executed although the user terminal is in a sufficient communication environment as 3RxD, the user terminal may activate a 4RxD function. Since the first signal state 10 corresponds to, for example, a very weak electric field, other conditions such as a Tx power associated with an uplink limit and an uplink error may be applied in the second signal state 20.

For example, if an uplink error is greater than or equal to a value although a Tx power of the user terminal has a maximum value, the user terminal may turn off a 4RxD operation although other conditions (e.g., a signal state, a DCI state, and the like) are met. The user terminal should transmit acknowledgement (ACK)/negative-ACK (NACK) information to data received from a base station to the base station. If an uplink error rate is high, the ACK/NACK information may fail to be correctly transmitted to the base station. If the base station does not receive the ACK/NACK information, since it transmits the same download data again to the user terminal, an unnecessary download operation may be repeated although Rx performance is increased by a 4RxD operation. Thus, according to an embodiment, in case of an environment determined that the ACK/NACK information may be correctly transmitted to the base station, for example, only if an uplink error is less than a value, the user terminal may activate the 4RxD operation.

In an embodiment, if a communication environment corresponds to the first signal state 10 in an RRC idle state, the user terminal may activate a 4RxD function or the best 2RxD selection function for paging reception.

If the user terminal is in an ON/OFF state or in a state change boundary in an ON state, the 4RxD function may be repeatedly activated/deactivated based on a signal state changed in real time and a change of a condition parameter. In this regard, a description will be given of an embodiment which includes hysteresis in a state change condition with reference to FIG. 2.

Figure 2:
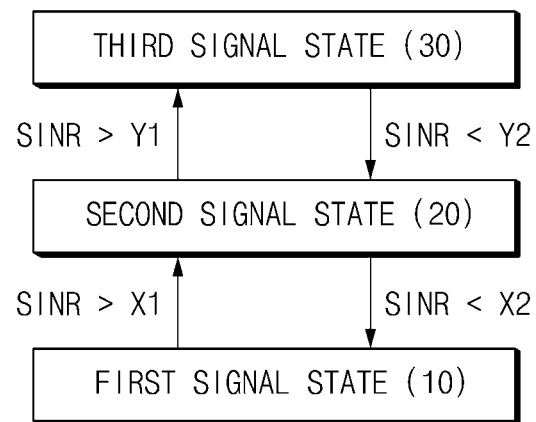
FIG. 2 illustrates a change in a communication environment of a user terminal according to another embodiment.

FIG. 2 is a drawing illustrating a change in a communication environment of a user terminal according to another embodiment.

Referring to FIG. 2, for example, if an SINR value measured by the user terminal which is in a first signal state 10 is greater than X1, the user terminal may determine its communication environment as a second signal state 20. In this state, if the measured SINR value is greater than Y1, the user terminal may determine its communication environment as a third signal state 30. If the SINR value is reduced to X2 or less, the user terminal may determine its communication environment as a first signal state 10. In this case, X2 may have a smaller value than X1.

If the measured SINR value is reduced to Y2 or less, the user terminal which is in the third signal state 30 may determine that it is in the second signal state 20. As such, the user terminal may determine its communication environment in a different way depending on its situation under the same SINR condition to reduce unnecessary antenna control. If the user terminal deactivates a 4RxD function since an SINR value measured by the user terminal is greater than Y1, although an SINR value measured again is reduced to a value which is less than Y1 and is greater than Y2, the user terminal may keep the 4RxD function inactivated.

As such, when a signal state is changed, as an SINR value which is criteria for a state change is set in a different way based on a communication environment to which the user terminal currently belongs, a function may be prevented from being repeatedly turned on/off during a short period of time and unexpected side effects due to the function may be prevented.

According to an embodiment, if a specific condition is repeatedly met or is maintained during a time, the user terminal may perform transition to a subsequent stage or a subsequent operation. For example, if the user terminal is in the third signal state 30 because an SINR value is greater than Y1, if the SINR value is reduced to Y2 or less a specified number or more of times or if the SINR value is maintained during a time after being reduced to Y2 or less, the user terminal may be changed to the second signal state 20.

Hereinafter, a description will be given of an example configuration of a user terminal to which embodiments of the present invention may be applied, with reference to FIGS. 3 and 4.

Figure 3:
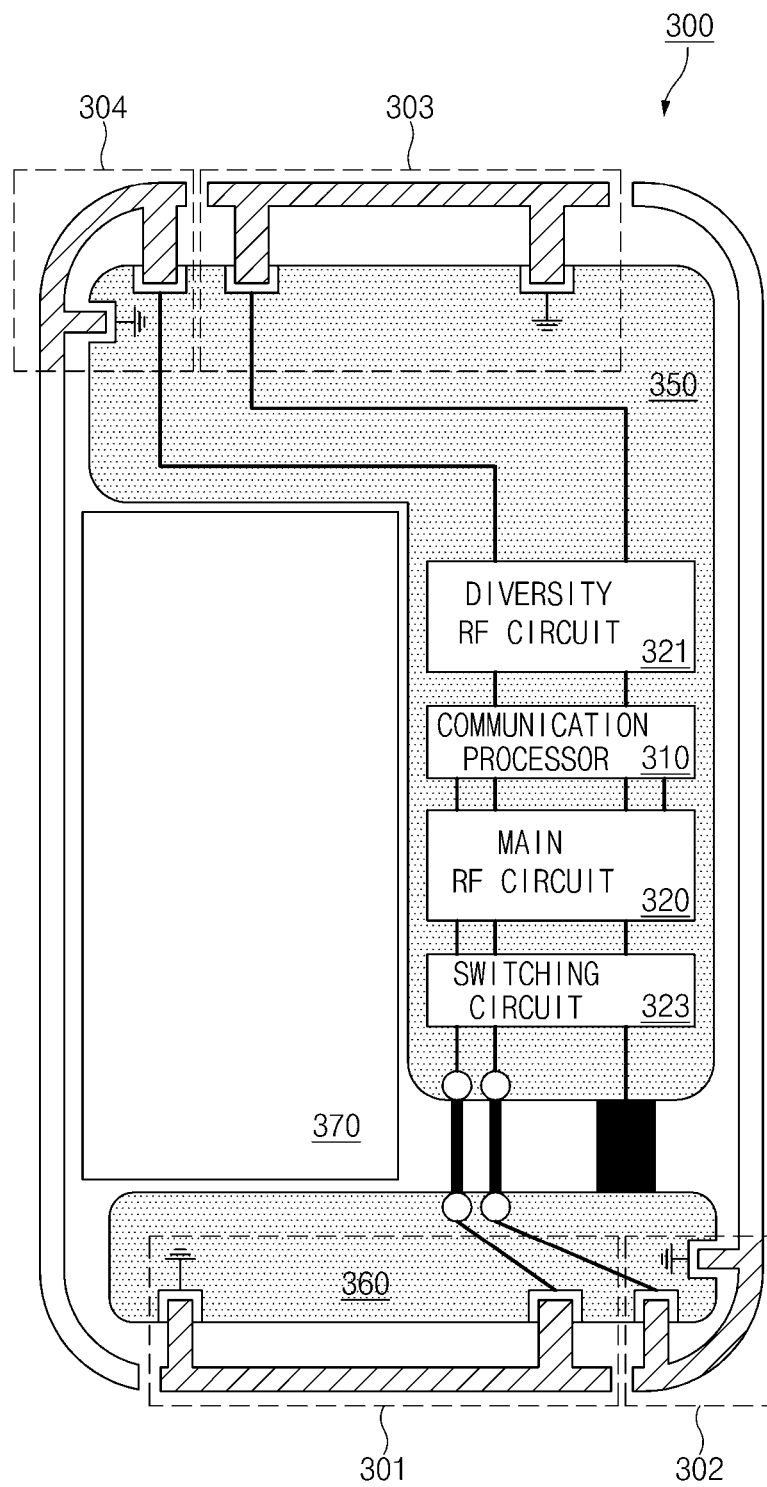
FIG. 3 illustrates example hardware components of a user terminal according to an embodiment.

FIG. 3 is a drawing illustrating example hardware components of a user terminal according to an embodiment.

Referring to FIG. 3, a user terminal 300 may include a communication processor (CP) 310. The CP 310 may be integrated with at least one processor such as another processing module, for example, an application processor (AP). For example, the CP 310 may be implemented in a system on chip (SoC). The CP 310 may be simply referred to as the processor 310 in the present disclosure.

The processor 310 may electrically connect with a radio frequency (RF) circuit, for example, an RF integrated circuit (RFIC) and may control an operation of the RF circuit. The RF circuit may correspond to a transceiver and may be understood as a concept including various hardware components, such as an amplifier (e.g., a power amplifier (PA) or a low noise amplifier (LNA)), a filter, or a switch other than the transceiver, for processing a signal received via an antenna (antenna radiator).

In an example of FIG. 3, the RF circuit may include a main RF circuit 320 and a diversity RF circuit 321. However, in another embodiment, the user terminal 300 may include three or more RF circuits or an integrated one RF circuit.

The main RF circuit 320 may connect with two main antennas located at a lower end of the user terminal 300. For example, the main RF circuit 320 may electrically connect with a first antenna 301 and a second antenna 302. According to an embodiment, each of the first antenna 301 and the second antenna 302 may have an electrical length for receiving at least one frequency band. For example, the first antenna 301 may receive a signal of a first frequency band, and the second antenna 302 may receive the signal of the first frequency signal and a signal of a second frequency signal. Both of the first antenna 301 and the second antenna 302 may receive the signal of the first frequency band in common, and a third antenna 303 and a fourth antenna 304 used as diversity Rx antennas may also receive the signal of the first frequency band in common. If the fourth antenna 304 is a sub-antenna of the second antenna 302, it may receive the signal of the second frequency band.

The user terminal 300 may have a variety of antenna structures other than the example shown in FIG. 3. The user terminal 300 is sufficient to have a plurality of antennas for implementing various embodiments disclosed in the present disclosure and is not limited to a device which has two antennas in its upper end and its lower end. For example, one Tx/Rx main antenna and a plurality of Rx antennas may be located in proper locations in consideration of other electronic components and a design of the user terminal 300. In addition, an antenna structure which may be changed in various manners by those skilled in the art may be considered.

In the example of FIG. 3, each of the first antenna 301 and the second antenna 302 may include part of a metal frame which forms a housing of the user terminal 300. Each of the first antenna 301 and the second antenna 302 may be extended to the inside of the user terminal 300. For example, the first antenna 301 and the second antenna 302 may be located at a lower end of the user terminal 300, and the third antenna 301 and the fourth antenna 304 may be located at an upper end of the user terminal 300.

The main RF circuit 320 may connect with the first antenna 301 and the second antenna 302 via the switching circuit 323 or a switch. The main RF circuit 320 may control the switching circuit 323 to change a primary antenna. For example, if transmitting a signal by using the first antenna 301 as a primary antenna (or a main antenna) (in this case, the third antenna 303 may correspond to a sub-antenna or a diversity antenna), the user terminal 300 may switch the main antenna from the first antenna 301 to the second antenna 302 if signal Tx and Rx performance using the first antenna 301 is reduced. In this case, a sub-antenna (e.g., the third antenna 303) corresponding to the first antenna 301 may be changed to a sub-antenna (e.g., the fourth antenna 404) corresponding to the second antenna 302. A description will be given of a mapping relationship between an antenna and a Tx/Rx port when the antenna switches with reference to FIG. 4.

Meanwhile, as described above, it may be understood as the concept that the switching circuit 323 is included in the main RF circuit 320.

The diversity RF circuit 321 may electrically connect with a sub-antenna for receiving a diversity signal of a primary antenna and may process a diversity signal received from the sub-antenna. For example, the diversity RF circuit 321 may electrically connect with the third antenna 303 and the fourth antenna 404. If the first antenna 301 receives the signal of the first frequency band signal and if the third antenna 303 is a sub-antenna of the first antenna 301, the third antenna 303 may also receive a (diversity) signal of the first frequency band. Since four antennas may receive a signal of the same frequency band in an embodiment of the present invention, if the first antenna 301 is a main antenna which receives the signal of the first frequency band, the second antenna 302, the third antenna 303, and the fourth antenna 304 may receive the diversity signal of the first frequency band (in case of a 4RxD operation).

The user terminal 300 may include a first printed circuit board (PCB) 350 and a second PCB 360. Various circuits and elements for processing a signal received from an antenna may be located in the first PCB 350 or the second PCB 360. Also, the first PCB 350 and the second PCB 360 may be electrically connected to each other. To supply power to components located on a PCB and feed power to an antenna radiator, the user terminal 300 may include a battery 370.

Figure 4:
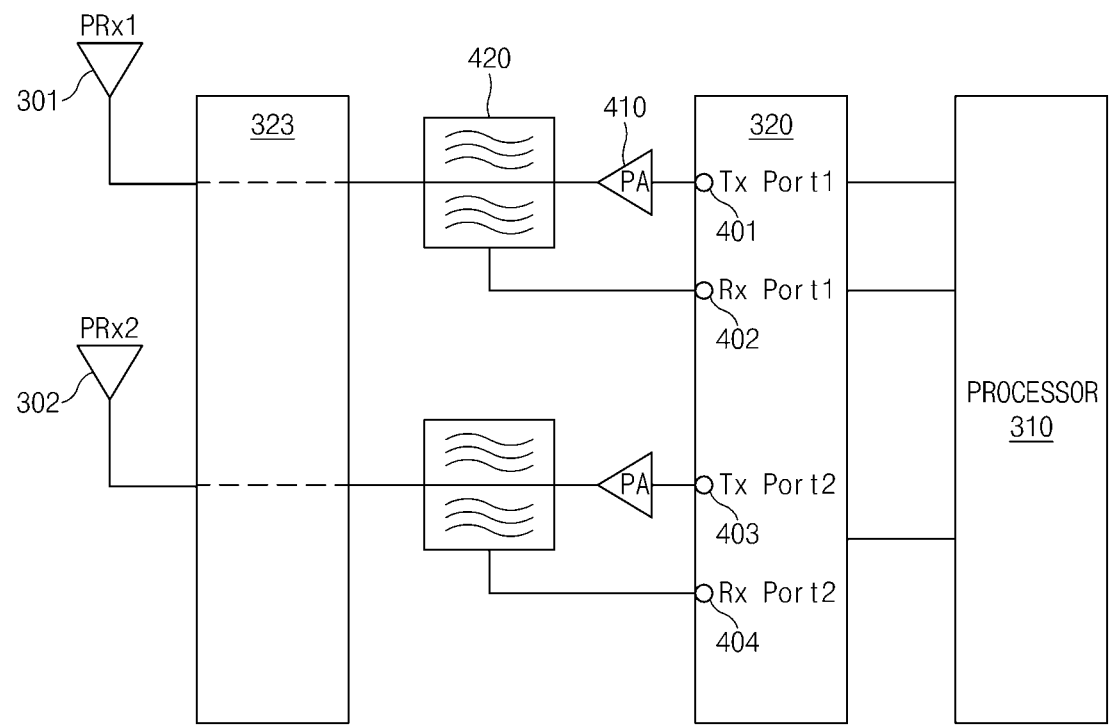
FIG. 4 illustrates a mapping structure between a reception (Rx) antenna and a radio frequency (RF) circuit based on transmission (Tx) antenna switching, according to an embodiment.
Figure 4:
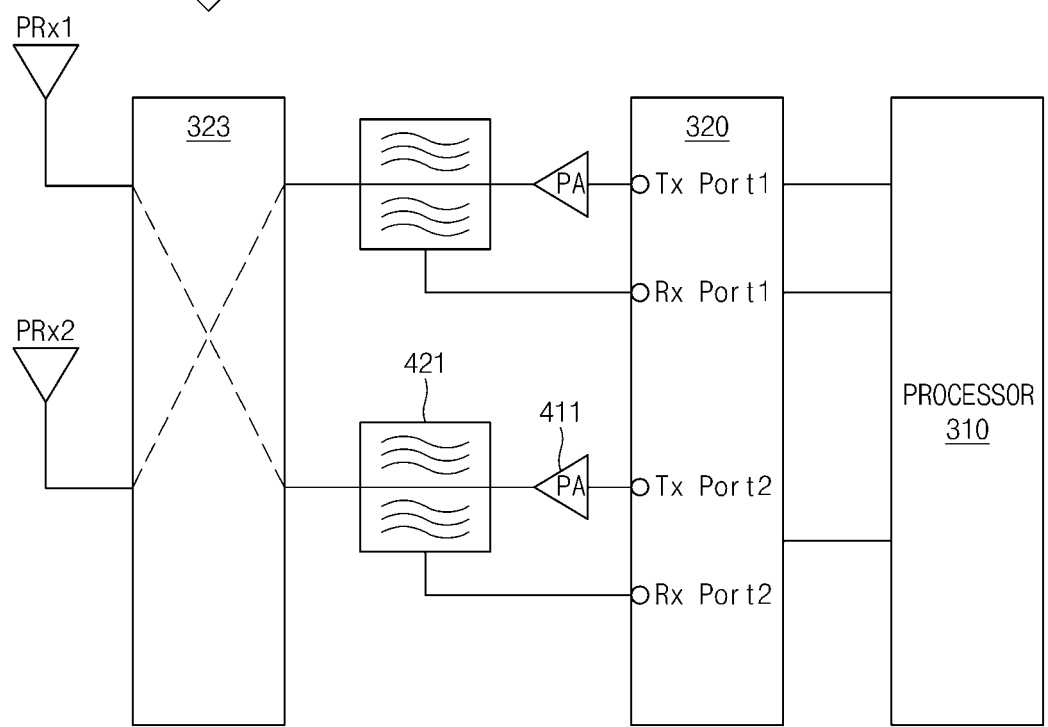

FIG. 4 is a drawing illustrating a mapping structure between an Rx antenna and an RF circuit based on Tx antenna switching, according to an embodiment. In an example of FIG. 4, a description will be given of an example of switching a primary antenna to a second antenna 302 in a situation where a first antenna 301 as a primary antenna transmits and receives a signal and where second to fourth antennas 302 to 304 receives a diversity signal.

Referring to FIG. 4, a processor 310 may connect with a Tx port 1 401 and an Rx port 1 402 of a main RF circuit 320. The Tx port 1 401 may connect with a power amplifier (PA) 410, and the PA may connect with a filter 420. The processor 310 may amplify a Tx power of a signal via the PA 410, may filter a signal of a desired frequency band via the filter 420, and may transmit the filtered signal to a base station via the first antenna 301.

Also, a signal of a desired frequency band in a signal received via the first antenna 301 may pass through the filter 420 and may then be transmitted to the processor 310 via the Rx port 1 402.

Since the second antenna 302 is not a main antenna, the main RF circuit 320 may fail to transmit a signal via a Tx port 2 403. In contrast, a signal received via the second antenna 302 may pass through a filter 421 and may then be transmitted to the processor 310 via an Rx port 2 404.

Further, although not illustrated, a signal of the same frequency band may be received via the third antenna 303 and the fourth antenna 304.

In this state, if the first antenna 301 results in reduced Tx or Rx performance due to any reason and if a primary antenna is switched from the first antenna 301 to the second antenna 302, the Tx port 1 401 and the Rx port 1 402 may be mapped to the second antenna 302.

If a user terminal 300 of FIG. 3 uses a 4RxD function, since it increases only signal Rx performance using fourth antennas, Tx and Rx performance imbalance may occur. For this reason, the user terminal 300 may perform a measurement report to a base station before the 4RxD function is operated although the 4RxD function is operated.

Hereinafter, a description will be given of embodiments applicable to various communication environments. A description will be additionally given of embodiments of supplementing functions or performance of described embodiments such as Tx/Rx performance imbalance.

1. RRC Connected State 1.1. Operation of a User Terminal in a Middle Weak Electric Field As described above with reference to FIGS. 1A to 1C, the user terminal 300 may receive a signal of a specific frequency band using four antennas to increase performance of a downlink data throughput, that is, download performance. The user terminal 300 may fail to operate a 4RxD function in a strong electric field and may receive a signal in a legacy scheme. Herein, the legacy scheme may refer to a scheme of receiving a signal using a main antenna (Tx and Rx) and a sub-antenna (diversity Rx). For convenience of classification, the legacy scheme or a scheme of receiving a signal using two antennas may be defined as a first mode, and a scheme of receiving a signal using four antennas according to an embodiment may be defined as a second mode.

As a factor of increasing the performance of the downlink data throughput, a packet Rx loss rate may be reduced at the user terminal 300 and/or a high MCS/coding rate may be used at a base station. The increase in the performance of the data throughput through the reduction of the packet Rx loss rate may mean that a packet error rate (PER) is low when the base station transmits a packet to the user terminal 300 at a data rate. Also, the increase in the performance of the data throughput through the use of the high MCS at the base station may be associated with a CQI report operation of the user terminal 300. For example, the user terminal 300 may report a channel state to the base station, and the base station may determine a proper MCS/coding rate of data to be transmitted to the user terminal 300 using information about a CQI included in the channel state report. Herein, in general, a CQI value may indicate MCS/coding rate information which may be received by the user terminal 300 on a current channel in consideration of an SINR value indicating Rx signal quality of the user terminal 300, receiver performance, and the like.

Thus, in a strong electric field with a high SINR value, an MCS and/or CQI value may be a maximum value although a signal is received in the first mode, that is, the legacy scheme. In other words, a meaningful effect may fail to be generated as compared with a data throughput of the first mode to current consumption although the second mode, that is, a 4RxD function is activated. In other words, an RF circuit may be limited to operate in the second mode to reduce power consumption in the strong electric field.

However, as described above, criteria of classifying a first signal state 10, a second signal state 20, and a third signal state 30 may be properly set by those skilled in the art. There is a situation where a 4RxD function is effective in the third signal state 30 (e.g., a strong electric field). Thus, in an embodiment disclosed in the present disclosure, the processor 310 may operate an RF circuit in the first mode (e.g., a 2RxD function) or the second mode (e.g., a 4RxD function) based on a current signal state of the user terminal 300. Hereinafter, a 4RxD operation in the strong electric field is excluded, and a description will be given of a 4RxD operation in a middle weak electric field.

Figure 5:
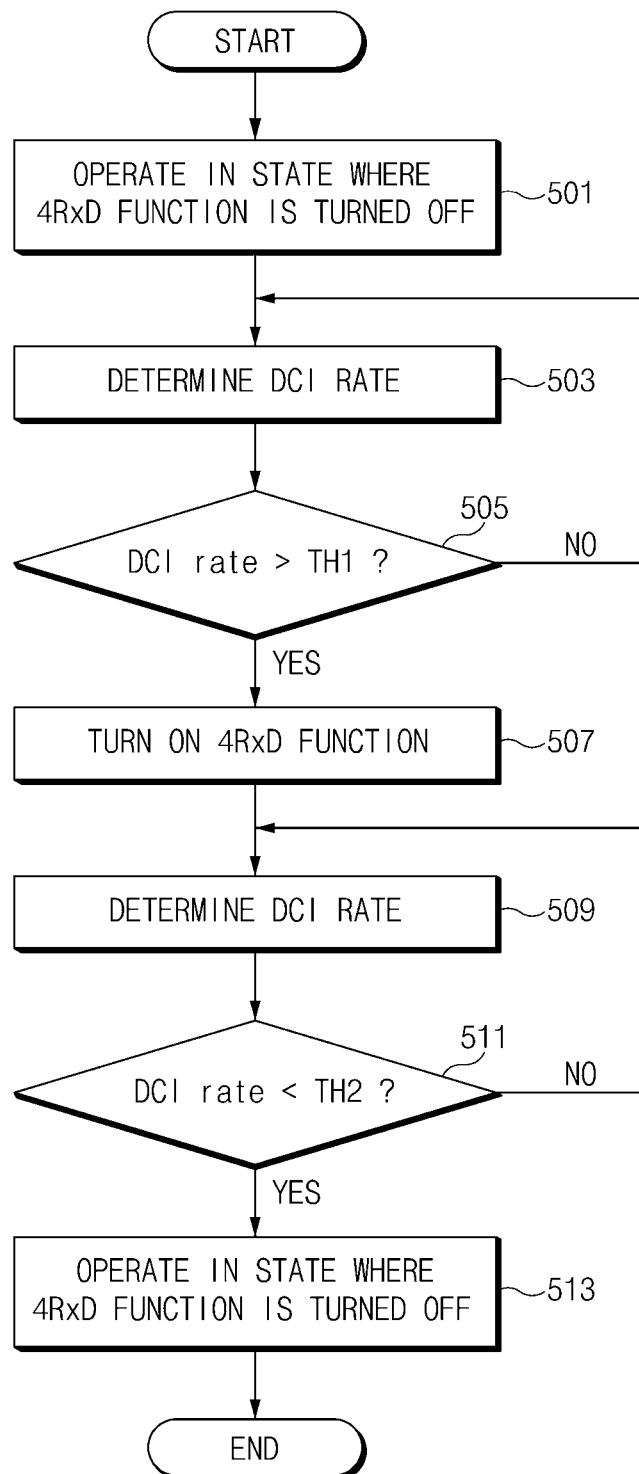
FIG. 5 is a flowchart illustrating an operation of an RF circuit in a middle weak electric field according to an embodiment.

FIG. 5 is a flowchart illustrating an operation of an RF circuit in a middle weak electric field according to an embodiment. In a description associated with FIG. 5, it is assumed that a user terminal 300 of FIG. 3 is in an RRC connected state in a middle weak electric field.

In operation 501, the user terminal 300 may operate in a state where it turns off a 4RxD function. For example, the user terminal 300 may transmit and receive a signal by using a first antenna 301 of FIG. 3 as a main antenna and may receive a signal of the same frequency band by using a third antenna 303 of FIG. 3 as a sub-antenna.

In operation 503, the user terminal 300 may verify a DCI rate. Herein, the DCI rate may be defined as a rate verified that there is data the user terminal 300 will receive, when a DCI of a PDCCH is verified during a time (e.g., 100 ms). For example, the DCI rate may be defined as the number of times that a download (DL) grant is downloaded for 100 ms. If the DCI rate is greater than or equal to a value, the user terminal 300 may verify that it may continue receiving data from a base station. Thus, if the user terminal 300 reports a higher CQI value to the base station and if the base station uses higher MCS based on the CQI value, a download throughput may be increased. In this regard, a description will be given with reference to FIGS. 6A and 6B.

Figure 6A:
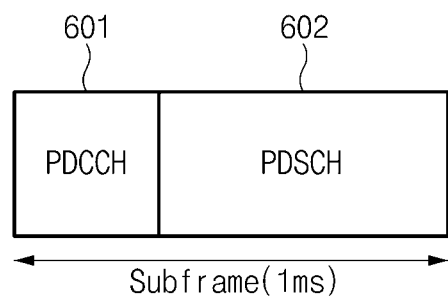
FIG. 6A conceptually illustrates a subframe structure on a downlink according to an embodiment.

FIG. 6A is a drawing conceptually illustrating a subframe structure on a downlink according to an embodiment. Referring to FIG. 6A, data transmission and reception in any communication environment (e.g., LTE) may be performed on a subframe-by-subframe basis. One subframe may correspond to a time of 1 ms in an LTE network and may include a PDCCH 601 and a PDSCH 602. The PDCCH 601 may include control information, and the PDSCH 602 may include data information. The user terminal 300 may verify whether there is data it will receive on the PDSCH 602 by decoding the control information of the PDCCH 601 every subframe. The user terminal 300 may analyze control information received during a unit time and may determine a rate at which there is data to be received. A description will be given of an example graph associated with the rate with reference to FIG. 6B.

Figure 6B:
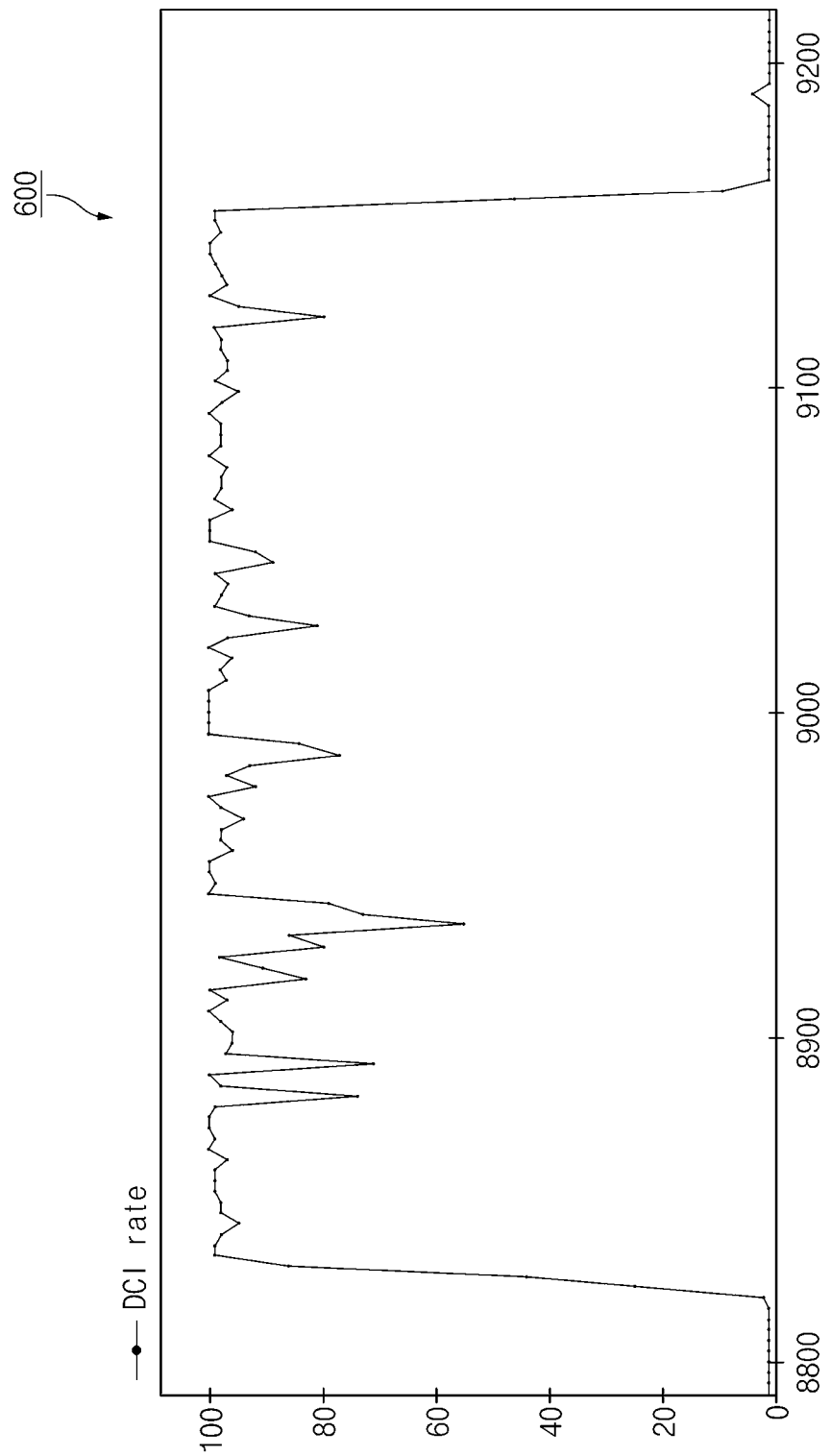
FIG. 6B illustrates a change of a downlink control information (DCI) rate upon a file download, according to an embodiment.

FIG. 6B is a drawing illustrating a change of a DCI rate upon a file download, according to an embodiment. A graph 600 shown in FIG. 6B is a graph for determining a rate at which there is data to be received at intervals of 100 ms, when the user terminal 300 downloads a file.

Referring to FIG. 6B, if a download is started (at about an 8820 point), it may be shown that a DCI rate is increased to be close to 100. Although there are intervals where the DCI rate is reduced around 80 at middle points, a high DCI rate may be maintained during an overall file download interval. If the file download is ended (at about a 9160 point), the DCI rate may be quickly reduced to converge to "0".

Referring again to FIG. 5, in operation 505, the user terminal 300 may determine whether the determined DCI rate is greater than a first threshold value TH1. For example, if it is determined that the first threshold value 70 and that the DCI rate is 75, DCI of 75% in DCI recently analyzed during a unit time (e.g., 100 ms) may mean that there is data the user terminal 300 will receive on a PDSCH.

If the DCI rate is greater than the first threshold value TH1, in operation 507, the user terminal 300 may turn on a 4RxD function to increase download performance. In other words, the user terminal 300 may operate a first mode which is a legacy scheme and may operate a second mode if a DCI rate is increased by a rate or more. If maintained in a state where the DCI rate is lower than the first threshold value TH1, the user terminal 300 may continue performing operation 503.

In an embodiment, as described above, if the number of times which is greater than the first threshold value TH1 is repeated during a value n or more or is maintained during a time, the user terminal 300 may perform operation 507. If the DCI rate is greater than the first threshold value TH1 n times in a row, if the number of times which is greater than the first threshold value TH1 during a time is greater than n times, or if a specified time is maintained in a state where the DCI rate is greater than the first threshold value TH1, the user terminal 300 may turn on a 4RxD function.

After the 4RxD function is activated, in operation 509, the user terminal 300 may continue determining a DCI rate. Operation 509 may be substantially the same as operation 503.

In operation 511, the user terminal 300 may determine whether the DCI rate is reduced to less than a second threshold value TH2. If the DCI rate is reduced to less than the second threshold value TH2, in operation 513, the user terminal 300 may turn off the 4RxD function. For example, if the second threshold value is 20 and if the measured DCI rate is 15, the user terminal 300 may determine that a file download is actually ended or will soon be ended and may turn off the 4RxD operation.

In this case, the user terminal 300 may receive a signal using two antennas (e.g., a default 2RxD function) activated in operation 501 or may receive a signal using changed two antennas (e.g., a best 2RxD function). An embodiment of selecting an Rx antenna after the RxD operation will be given with reference to FIG. 9 and the like.

In an embodiment of FIG. 5, the first threshold value TH1 for activating the 4RxD function and the second threshold value TH2 for deactivating the 4RxD function (and activating a 2RxD function) are set to different values. In other words, the second threshold value may correspond to a DCI rate which is lower than the first threshold value. However, in another embodiment, the first threshold value and the second threshold value may be set to the same value. For example, if the DCI rate is greater than 50, the user terminal 300 may receive a signal using all of four antennas. If the DCI rate is reduced to less than 50, the user terminal 300 may receive a signal using only two antennas. In this case, a processor 310 of FIG. 3 may have a delay to prevent an Rx mode of an antenna from being frequently changed. For example, the processor 310 may control RF circuits 320 and 321 to operate in a second mode (e.g., a 4RxD operation) if the DCI rate is greater than 50, may maintain a current operation mode (i.e., the second mode) of the RF circuits 320 and 321 although the DCI rate is reduced to less than 50 for two seconds (2000 ms), and may control the RF circuits 320 and 321 to operate in a first mode (e.g., a 2RxD operation) after two seconds elapse.

1.2. Operation of a User Terminal in a Very Weak Electric Field

If the user terminal 300 is in the very weak electric field, it may operate in a few different manners as compared with when it is in a middle weak electric field. In detail, an RF circuit may operate as the 4RxD operation or the 2RxD operation based on whether the user terminal 300 performs a VoLTE call or a simple data download. Also, although a data download is performed, a DCI rate may have a threshold value different from a threshold value set in the middle weak electric field. In this regard, a description will be given with reference to FIG. 7.

Figure 7:
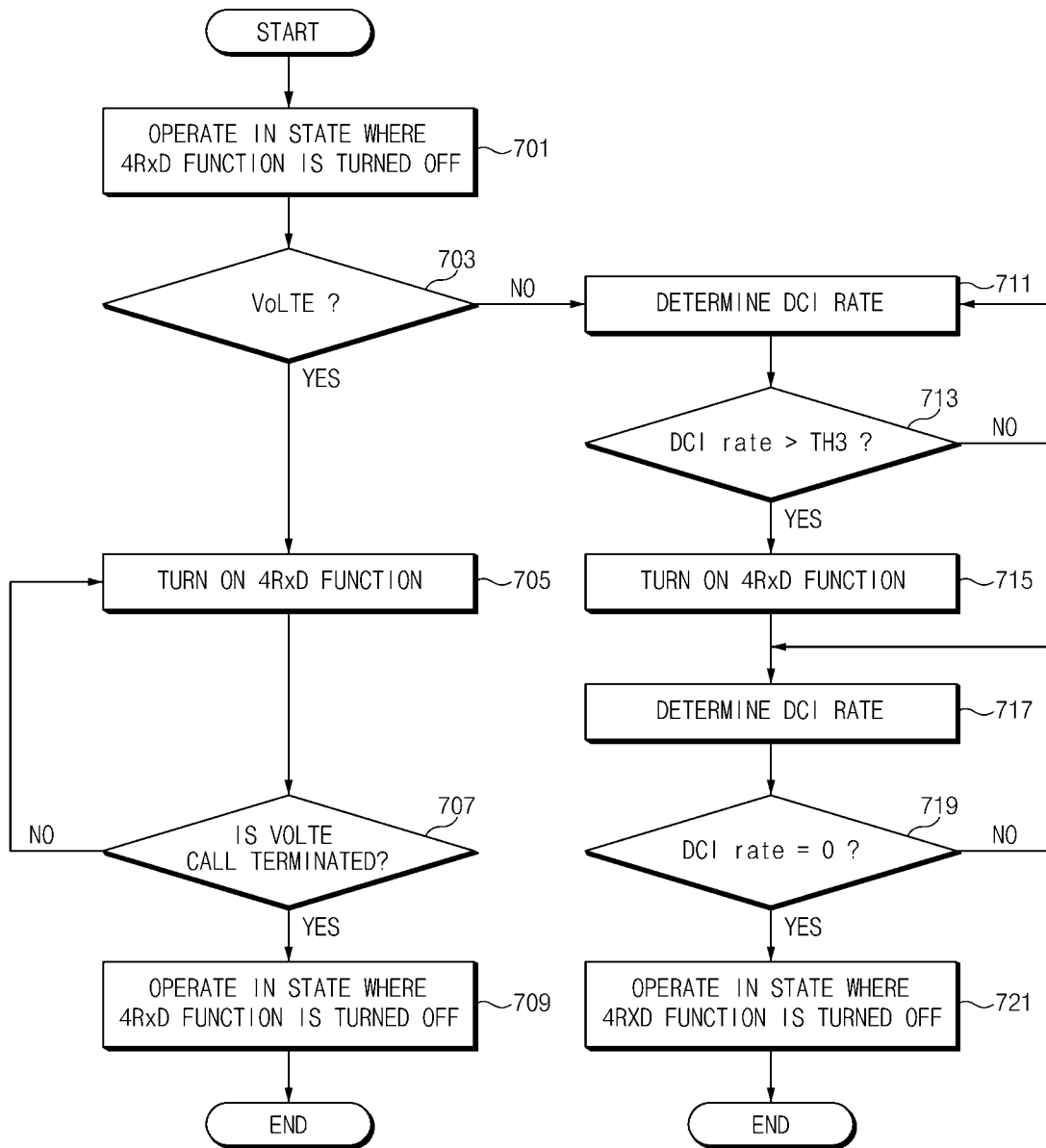
FIG. 7 is a flowchart illustrating an operation of an RF circuit in a very weak electric field according to an embodiment.

FIG. 7 is a flowchart illustrating an operation of an RF circuit in a very weak electric field according to an embodiment.

In operation 701, a user terminal 300 of FIG. 3 may operate in a state where a 4RxD function is turned off. For example, the user terminal 300 may transmit and receive a signal by using a first antenna 301 of FIG. 3 as a main antenna and may receive a signal of the same frequency band by using a third antenna 303 of FIG. 3 as a sub-antenna.

In operation 703, the user terminal 300 may determine whether a VoLTE function is being executed. For example, a processor 310 of FIG. 3 may determine the VoLTE function is currently executed based on whether an internal codec operates or whether a VoLTE application is executed.

If the VoLTE function is executed, in operation 705, the user terminal 300 may activate a 4RxD function. In case of VoLTE, since a DCI rate is not high frequently, for example, if called parties say nothing to each other or in case of a mute state, the processor 310 may operate an RF circuit in a second mode irrespective of a DCI rate. As such, a call drop which occurs due to an Rx performance problem may be avoided if Rx performance of a VoLTE packet is increased, by operating a 4RxD function in a very weak electric field.

In operation 707, the user terminal 300 may determine whether a VoLTE call is terminated. If the VoLTE call is terminated, in operation 709, the user terminal 300 may turn off the 4RxD function. However, in an embodiment, since the packet Rx rate itself other than data download performance may become a problem in the very weak electric field, the user terminal 300 may fail to turn off the 4RxD function as soon as the VoLTE is terminated and may proceed to operation 711 to determine a DCI rate.

As operations 711, 713, 715, 717, and 721 respectively correspond to operations 503, 505, 507, 509, 511, and 513 described with reference to FIG. 5, a repeated description will be omitted hereinafter.

In operation 711, the user terminal 300 may determine the DCI rate.

In operation 713, the user terminal 300 may determine whether the determined DCI rate is greater than a third threshold value TH3. For example, the third threshold value TH3 may be set to be lower than a second threshold value which is criteria of deactivating the 4RxD function in a middle weak electric field, for example, if a DCI rate is "10". The user terminal 300 may increase a data download throughput and may reduce a packet Rx error rate (e.g., a PER) by setting a DCI rate to be lower in the very weak electric field. In other words, the user terminal 300 may activate the 4RxD function to increase a download throughput and enhance a packet Rx rate in the very weak electric field.

If the DCI rate is greater than the third threshold value TH3, in operation 715, the processor 310 of the user terminal 300 may control an RF circuit to operate in a second mode. In operation 717, the user terminal 300 may continue determining a DCI rate. In operation 719, the user terminal 300 may determine whether a DCI rate is "0". If the DCI rate is "0", the user terminal 300 may change from the second mode to a first mode and may receive a signal. In this example, it is assumed that the DCI is "0", that is, that there is no data to be actually downloaded. However, if it is determined that there is no data to be actually downloaded, for example, if the DCR rate has any value between "0" and "2", the user terminal 300 may change from the second mode to the first mode and may receive a signal. In other words, if the DCI rate is reduced to less than a fourth threshold value TH4, the user terminal 300 may change an operation mode of an RF circuit to the first mode.

The threshold values of the DCI rate described with reference to FIG. 5 or other drawings may be automatically be set by the user terminal 300 or may be manually set by user settings. The DCI rate may have a specific pattern based on behavior of a user. For example, in case of a general file download, the DCI value may have a value of a pattern shown in FIG. 6B. However, in case of real-time streaming, a lower DCI rate value may be maintained than a file download. Also, if a specific application such as YouTube is being executed, a pattern similar to a file download may be shown on video streaming middle points.

Thus, the user terminal 300 may optimize a DCI rate threshold condition to suit the user. In other words, the user terminal 300 may reduce a DCI rate threshold value in an SINR interval with a possibility that a packet Rx problem will occur, that is, a specific ON state and may operate a 4RxD function for users who frequently view real-time streaming. The user terminal 300 may set a DCI rate threshold value to be higher for users who does not view real-time streaming frequently to prevent additional current consumption.

2. RRC Idle State

A process shown in FIG. 5 indicates an embodiment of an operation of the user terminal 300 if the user terminal 300 is in a middle weak electric field in an RRC connected state. The process shown in FIG. 7 indicates an embodiment of an operation of the user terminal 300 if the user terminal 300 is in a very weak electric field in the RRC connected state.

In general, if the user terminal 300 is in an RRC idle state, it may receive a paging packet on a periodic basis. Receiving the paging packet, the user terminal 300 may perform an operation of being attached to a base station and may receive data from the base station after changing to the RRC connected state. If the user terminal 300 does not receive a paging packet, since it does not receive data from a called party's terminal, a problem such as a message transmission delay occurs in a real-time chat. Therefore, if there is a probability that a problem of receiving a paging packet will occur, the user terminal 400 may address the problem through a 4RxD operation. An example process will be described with reference to FIG. 8.

Figure 8:
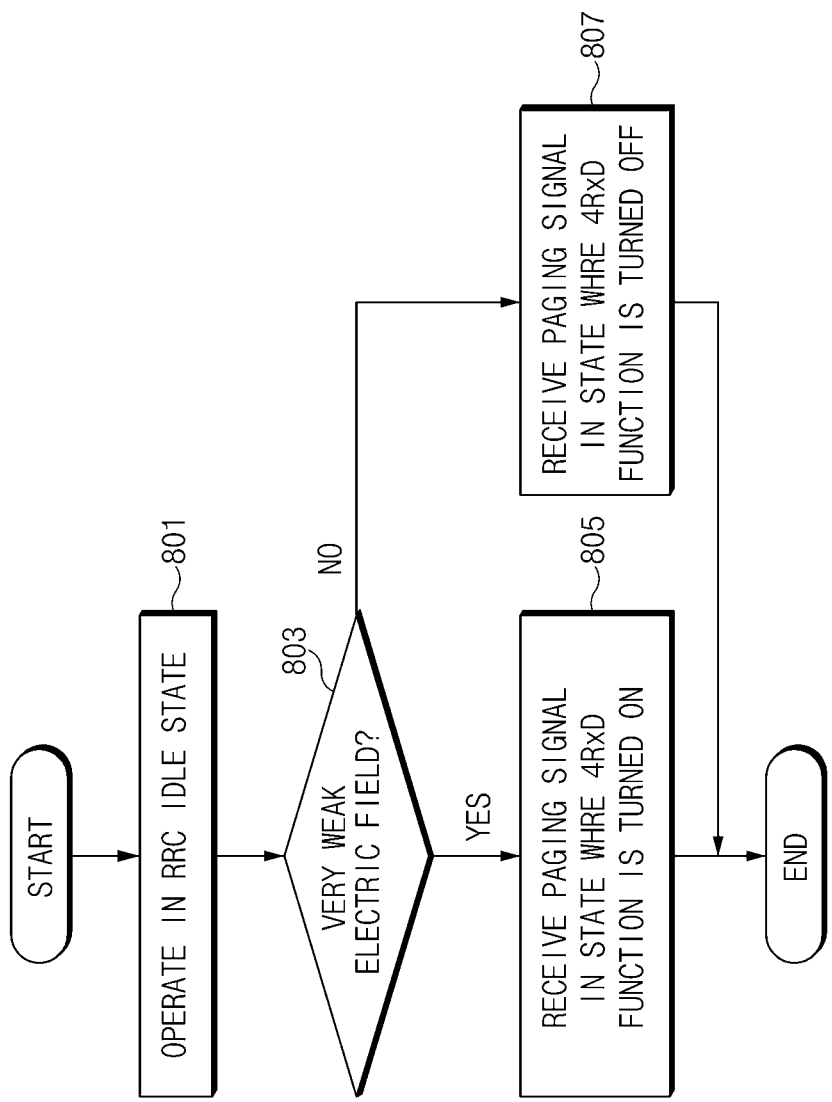
FIG. 8 is a flowchart illustrating an operation of an RF circuit in a radio resource control (RRC) idle state according to an embodiment.

FIG. 8 is a flowchart illustrating an operation of an RF circuit in an RRC idle state according to an embodiment.

In operation 801, a user terminal 300 of FIG. 3 may operate in an RRC idle state. For example, the user terminal 300 may perform a DRX operation for maintaining a connection with a base station in the RRC idle state. The user terminal 300 in the RRC idle state may receive a paging packet at a period from the base station.

In operation 803, the user terminal 300 may determine whether a current signal state corresponds to a very weak electric field, based on a measured SINR value and the like.

In the signal state corresponds to the very weak electric field, in operation 805, the user terminal 300 may receive a paging signal in a second mode, that is, using four antennas. In other words, if the signal state corresponds to the very weak electric field, the user terminal 300 may activate a 4RxD function over a DRX period. If the signal state does not correspond to the very weak electric field, for example, if the user terminal 300 is in a middle weak electric field or a strong electric field, since there is a low probability that a packet loss problem will occur, in operation 807, the user terminal 300 may receive a paging signal in a legacy scheme (e.g., 2RxD).

3. Embodiment of Using a 4RxD Function

In a frequency band where the user terminal 300 may use the 4RxD function, all of four antennas of the user terminal 300 may receive a signal of a frequency band in common. In other words, when the user terminal 300 receives a signal using two antennas, it may receive the signal using the two best antennas (e.g., the best 2RxD function) with the best signal Rx state, rather than using a main antenna and a sub-antenna which are set to a default, for example, a first antenna 301 of FIG. 3 and a third antenna 303 for receiving a diversity signal as Rx antennas. An embodiment associated with the two best antennas will be described with reference to FIG. 9. In a description below, contents repeated with the above-mentioned contents or corresponding or similar to the above-mentioned contents may be omitted from the description below.

Figure 9:
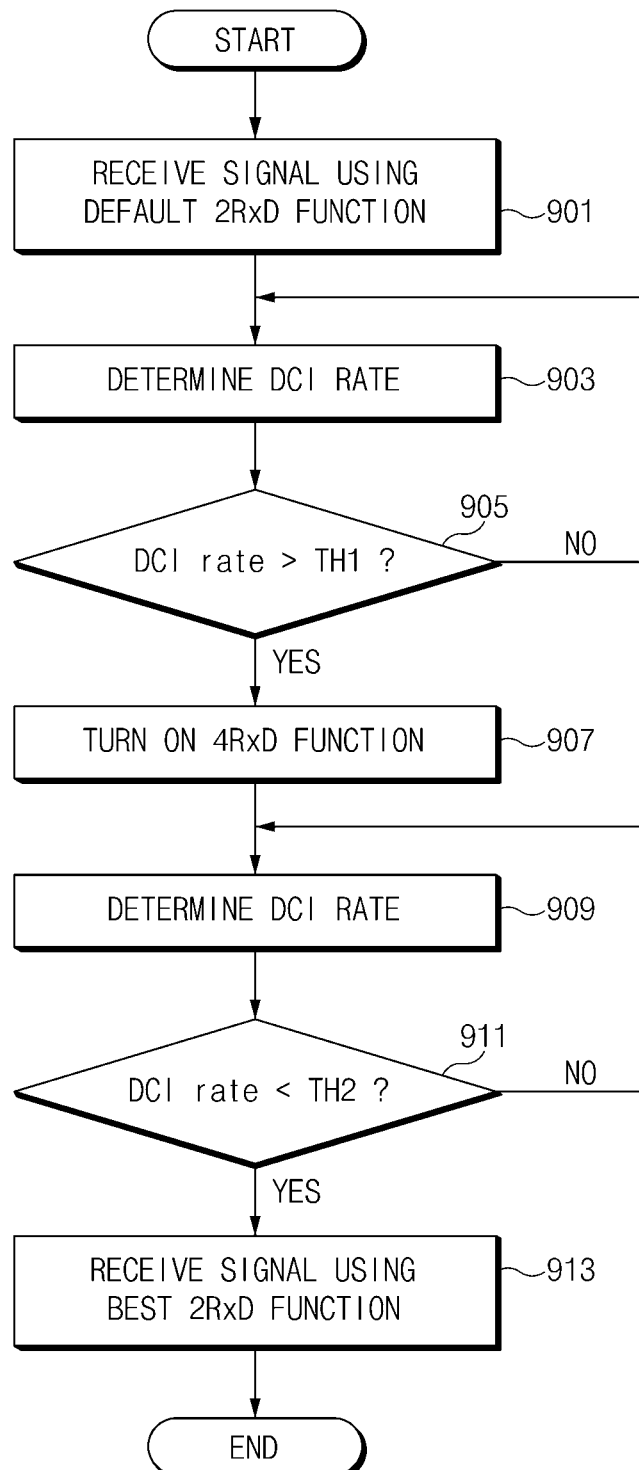
FIG. 9 is a flowchart illustrating an operation of an adaptive RF circuit in a middle weak electric field according to an embodiment.

FIG. 9 is a flowchart illustrating an operation of an adaptive RF circuit in a middle weak electric field according to an embodiment.

Referring to FIG. 9, in operation 901, a user terminal 300 of FIG. 1 may receive a signal using two antennas which are set to a default. For example, the user terminal 300 may receive a signal using a first antenna 301 and a second antenna 303 of FIG. 3.

In operation 903, the user terminal 300 may determine a DCI rate.

In operation 905, the user terminal 300 may determine whether the DCI rate is greater than a first threshold value TH1.

If the DCI rate is greater than the first threshold value TH1, in operation 907, the user terminal 300 may activate a 4RxD function. In this case, since the user terminal 300 receives a signal from all of four antennas, it may determine signal Rx sensitivity for each antenna. Information about the signal Rx sensitivity for each antenna may be used to select the two best antennas in operation 913.

In operation 909, the user terminal 300 may determine a DCI rate.

In operation 911, the user terminal 300 may determine whether the DCI rate is less than a second threshold value TH2.

If the DCI rate is less than the second threshold value TH2, in operation 913, the user terminal 300 may receive a signal using two antennas. Receiving the signal, the two antennas may be different from an antenna before a 4RxD operation. For example, if it is determined that a second antenna 302 and a third antenna 303 of FIG. 3 have high Rx sensitivity upon the 4RxD operation, a processor 310 of FIG. 3 may control an RF circuit to receive a signal using the second antenna 302 and the third antenna 303.

In the above-mentioned embodiment, the description is given of if a signal is received using the two Rx antennas or the four Rx antennas. However, according to an embodiment, it is possible to receive a signal using three Rx antennas. In other words, an RF circuit may operate in a third mode of receiving a signal using a 3RxD function, other than a first mode of receiving a signal using a 2RxD function and a second mode of receiving a signal using a 4RxD function. An embodiment associated with this will be described with reference to FIG. 10.

Figure 10:
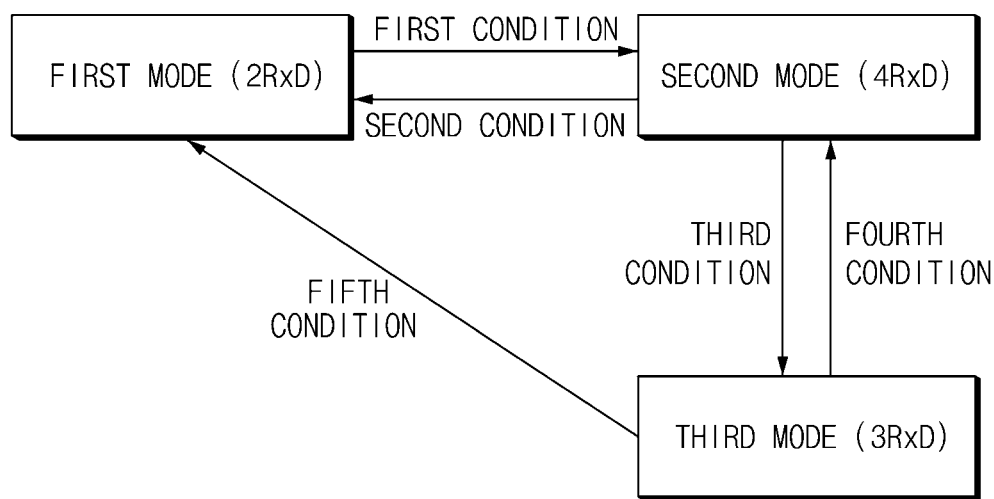
FIG. 10 illustrates an operation of an adaptive RF circuit according to a 4 Rx diversity (4RxD) operation, according to an embodiment.

FIG. 10 is a drawing illustrating an operation of an adaptive RF circuit according to a 4RxD operation, according to an embodiment.

Referring to FIG. 10, a user terminal 300 of FIG. 3 may operate in a first mode in a very weak electric field. Herein, the first mode may correspond to a state where the user terminal 300 receives a signal using two Rx antennas, for example, a main Tx/Rx antenna and a diversity Rx antenna. The two Rx antennas may be two antennas (e.g., a default 2RxD function) set to a default and may be two antennas (e.g., the best 2RxD function) with the best signal sensitivity, selected in a 4RxD operation.

In the very weak electric field, if a first condition is met, the user terminal 300 may operate in a second mode of operating all of four Rx antennas. Herein, the first condition may be defined hereinafter.

A. An average SINR of two Rx antennas which are in use<a first threshold value; and B. DCI rate>a third threshold value.

In the description associated with FIG. 10, an SINR value about the best antenna among antennas which may be used by the user terminal 300 other than an average SINR value may be used as criteria of determining a signal state. For example, if signal Rx (e.g., a 2RxD function) using two antennas is changed to signal Rx (e.g., a 4RxD function) using four antennas, the user terminal 300 may determine whether to perform transition relative to the best antenna value between the two antennas. Conversely, (if the 4RxD function is changed to the 2RxD function), the user terminal 300 may determine whether to perform transition relative to the best antenna among the four antennas. This may be applied to various embodiments disclosed in the present disclosure other than the description associated with FIG. 10.

An A condition in the first condition may mean that an SINR value is low, that is, a signal state is poor, and a B condition in the first condition may mean that a DCI rate is higher than a level, that is, that there is data to be received. In other words, if a signal state is poor and if there is data to be received, the user terminal 300 may receive a signal using four antennas.

In this state, if a second condition is met, the user terminal 300 may return to the first mode. The second condition may be defined hereinafter.

A. An average SINR of the two best Rx antennas>a first threshold value+a; and

B. DCI rate<fourth threshold value.

To request an SINR value which is higher than the first threshold value by a constant "a" in an A condition of the second condition may be understood to prevent the first mode and the second mode from being repeatedly changed within a short time. In other words, if a signal state is enhanced and if data to be downloaded is reduced to a level or less, the user terminal 300 may receive a signal again using the two antennas. In this case, the user terminal 300 may receive a signal using the 2 best Rx antennas determined while it operates in the second mode.

In the state where the user terminal 300 operates in the second mode, if a third condition is met, the user terminal 300 may receive a signal using three antennas. Herein, the third condition may be defined hereinafter.

A. An average SINR of the three antennas to be used>a second threshold value+b;

B. An average SINR of the three best antennas−an SINR of the worst antenna>a third threshold value; and C. DCI rate<fourth threshold value In this case, in a state where there are some data to be downloaded, if average signal quality of three antennas is greater than or equal to a level and if average signal quality of the three best antennas is greater than or equal to a level of signal quality of the worst antenna, the user terminal 300 may receive data using the three antennas. If average signal quality of three antennas is of a proper level in a situation where there is data to be downloaded and if signal quality of the other is very poor, to receive data all of the four antennas may increase power consumption or may fail to have a great effect on a data throughput. Thus, the user terminal 300 may save power consumption while maintaining a data throughput by excluding the one antenna with poor signal quality and receiving a signal using the three antennas. If Rx signal quality using three antennas is reduced to a level or more in a situation where there is data to be downloaded, the user terminal 300 may activate all the four antennas again and may return to the second mode. A fourth condition of returning from the third mode to the second mode may be defined hereinafter.

A. An average SINR of three antennas which are in use>a second threshold value; and B. DCI rate<fourth threshold value If a fifth condition is met, the user terminal 300 which operates in the third mode may operate in the first mode. For example, the fifth condition may be defined hereinafter.

A. An average SINR of the two best antennas>a first threshold value+a; and

B. DCI rate<fourth threshold value

In other words, if sufficient signal quality is obtained via only two antennas and if there are a few data to be downloaded, the user terminal 300 may receive data via only two (best) antennas to save power consumption.

In an embodiment, the user terminal 300 which operates in the second mode may operate in the first mode or the third mode based on signal quality and a DCI rate. If both of the second condition and the third condition are met, the user terminal 300 may give the second condition priority. For example, the user terminal 200 may reduce current consumption by first applying the second condition and operating in the first mode. Similarly, the user terminal 200 which is in the third mode may operate in the first mode or the second mode based on a met condition. In this case, the user terminal 200 may give the fifth condition priority relative to power consumption.

A threshold value and constants "a" and "b" indicating signal quality or a DCI rate in each condition may be properly defined through a policy of a manufacturer/communication company or a product test. The defined value may be previously recorded as a non-variable value in a memory of the user terminal 300. Herein, the memory may correspond to a storage space located in a processor 310 of FIG. 3.

In addition, an embodiment is exemplified as the 2RxD function and the 4RxD function may operate in the middle weak electric field and as the 2RxD function, the 3RxD function, and the 4RxD function may operate in the very weak electric field. However, embodiments of the present invention are not limited thereto. There may be embodiments modified in various manners. For example, the user terminal 300 may receive a signal using some (e.g., an N−1 antenna, an N−2 antenna, and the like) or all of a plurality of antennas (e.g., N antennas) included in the user terminal 300, based on a setting defined in an ON state.

According to an embodiment, a 4RxD function in a middle weak electric field may operate, for example, if a DCI rate is greater than or equal to 70. If a state where the DCI rate is less than 70 is continuously maintained, the user terminal 300 may continue receiving a signal via finally selected two antennas (e.g., two best Rx antennas). If the 4RxD function is not operated not once since the DCI rate is greater than 70, the user terminal 300 may continue receiving a signal via two default Rx antennas.

In an embodiment, a periodic 4 Rx antenna monitoring operation may be performed to quickly find the best Rx antenna combination in response to a change in a signal Rx environment of the use terminal 300 by a user condition such as hand-grip. A description will be given with reference to FIG. 11 in connection with the periodic 4Rx antenna monitoring operation.

Figure 11:
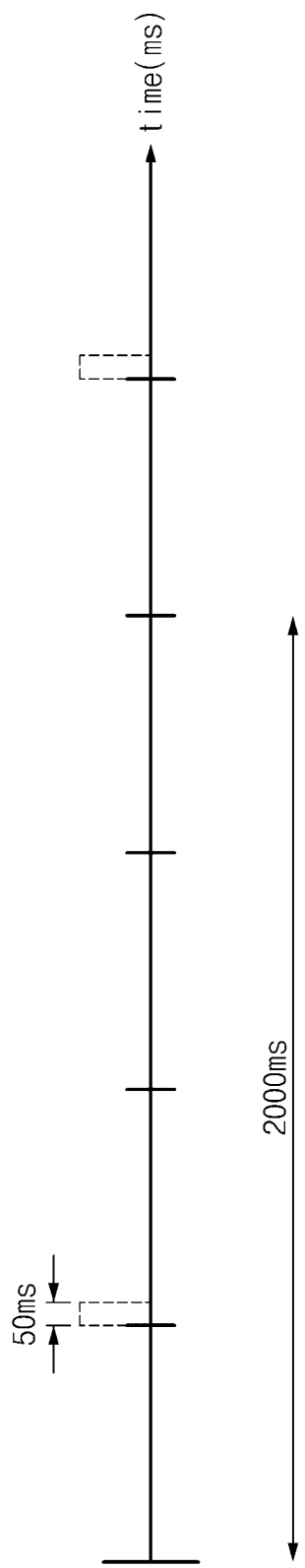
FIG. 11 is illustrates a monitoring period for determining the best Rx antenna according to an embodiment.

FIG. 11 is a drawing illustrating a monitoring period for determining an optimum Rx antenna according to an embodiment.

Referring to FIG. 11, a user terminal 300 of FIG. 3 may periodically perform an operation of operating four Rx antennas every 50 ms at intervals of 2 seconds and finding the two best Rx antennas. For example, the user terminal 300 may operate to determine performance of the four Rx antennas for 50 ms and select a combination of the two best antennas. A period of 2 seconds and an operation time of 50 ms shown in FIG. 11 may be an example and may be properly changed by those skilled in the art.

The monitoring operation described with reference to FIG. 11 may be performed when the user terminal 300 is in a middle weak electric field and a very weak electric field. For example, if a signal state determined based on a parameter indicating signal quality or signal strength corresponds to a strong electric field, the user terminal 300 may fail to perform the monitoring operation. It may be understood that this is to save current consumption since Rx signal quality is already good in the strong electric field. In general, the user terminal 300 may perform the monitoring operation in an ON state (e.g., a middle weak electric field and a very weak electric field) according to an embodiment selectively if necessary.

In addition, if there is no data received from a base station during a time or more (i.e., if a DCI rate is "0"), the user terminal 300 may fail to perform the monitoring operation. In this case, the user terminal 300 may maintain the two best Rx antennas (e.g., a best 2RxD function) selected if necessary and may select a specific 2RxD antenna combination (e.g., a default 2RxD function).

If the user terminal 300 supports carrier aggregation (CA), the user terminal 300 may activate a 4RxD function in a CA status. The user terminal 300 may use CA for two or more cells (e.g., a primary cell and a secondary cell) to operate the 4RxD function during CA. In this case, if one or more of two cells are cells corresponding to a frequency band for supporting the 4RxD function, the user terminal 300 may operate the 4RxD function. If the 4RxD function is supported by both the two cells, the user terminal 300 in an embodiment may select the primary cell and may activate the 4RxD function. If an RSRP value of the secondary cell is lower than that of the primary cell by a specified numeric value (e.g., 10 dB), the user terminal 300 may select the secondary cell and may activate the 4RxD function. In general, if there are a plurality of bands which may perform the 4RxD operation among several bands which may use CA, the 4RxD operation may be activated for all of the plurality of bands or the 4RxD operation may be selectively activated. In this case, priority is assigned to a band corresponding to a frequency band which may be supported by the primary cell.

In addition, priority may be determined based on an available resource status of the user terminal 300. For example, the 4RxD function may be activated for a band with relatively many available hardware resources. Also, the 4RxD function may fail to be activated for a band with relatively insufficient available hardware resources. This resource state may be closely associated with a communication environment of the user terminal 300. Also, a 4RxD activation band may be adaptively changed based on an overall communication environment of the user terminal 300.

In a CA status, conditions associated with the above-mentioned several communication environments may be applied to the user terminal 300. For example, if CA is achieved in an RRC connected state and in a very weak electric field or middle weak electric field, a proper cell may be selected and the 4RxD operation may be achieved.

In an embodiment, the 4RxD function may be used to find the two best Rx antennas in an RRC idle state. In this regard, a description will be given with reference to FIG. 12.

Figure 12:
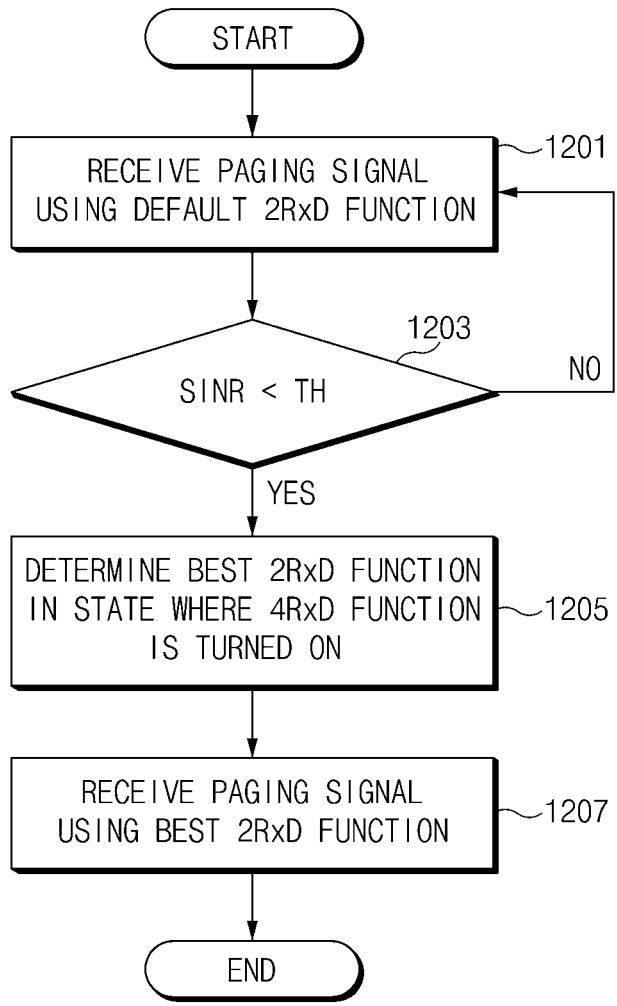
FIG. 12 is a flowchart illustrating an operation of determining the best Rx antenna in an RRC idle state according to an embodiment.

FIG. 12 is a flowchart illustrating an operation of determining the best Rx antenna in an RRC idle state according to an embodiment.

In operation 1201, a user terminal 300 of FIG. 3 may receive a signal using two antennas which are set to a default to receive a paging signal.

In operation 1203, the user terminal 300 may determine whether an SINR value is reduced to less than a threshold value TH. Herein, the threshold value may correspond to a value (e.g., an SINR=0) corresponding to criteria of determining whether a signal state of the user terminal 300 corresponds to a very weak electric field.

If the SINR value is reduced to less than the threshold value TH, in other words, if the signal state of the user terminal 300 corresponds to the very weak electric field, in operation 1205, the user terminal 300 may activate four Rx antennas and may scan the two best Rx antennas. This process may progress for a few microseconds.

In operation 1207, the user terminal 300 may receive a paging signal using the two best Rx antennas.

A measured SINR value may be relatively good by configuring Rx antennas for receiving a paging signal with a combination of the two best antennas. The process of FIG. 12, particularly, operation 1205 may operate on a periodic basis. For example, operation 1205 may operate at a period which is N multiples of a period (e.g., a DRX operation period) when a paging signal is received. For example, if N is "2" and if an SINR value of an Rx signal measured via currently selected two antennas is reduced to less than a threshold value twice, the user terminal 300 may execute the process of FIG. 12 and may select the two best antennas again.

Figure 13:
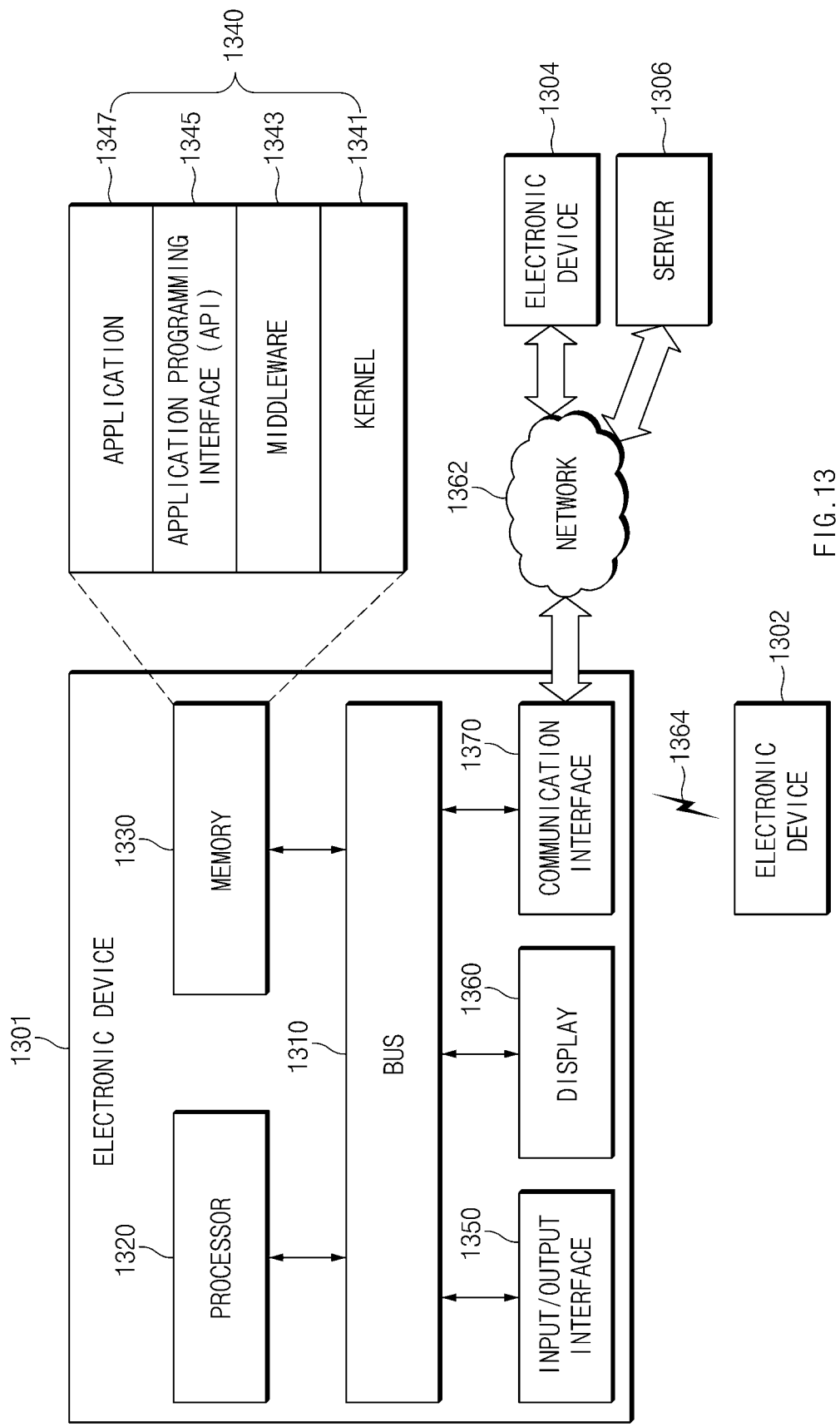
FIG. 13 illustrates an electronic device in a network environment according to an embodiment of the present disclosure.

FIG. 13 illustrates an electronic device in a network environment according to an embodiment of the present disclosure.

An electronic device 1301 in a network environment 1300 according to various embodiments of the present disclosure will be described with reference to FIG. 13. The electronic device 1301 may include a bus 1310, a processor 1320, a memory 1330, an input/output interface 1350, a display 1360, and a communication interface 1370. In various embodiments of the present disclosure, at least one of the foregoing elements may be omitted or another element may be added to the electronic device 1301.

The bus 1310 may include a circuit for connecting the above-mentioned elements 1310 to 1370 to each other and transferring communications (e.g., control messages and/or data) among the above-mentioned elements.

The processor 1320 may include at least one of a central processing unit (CPU), an application processor (AP), or a communication processor (CP). The processor 1320 may perform data processing or an operation related to communication and/or control of at least one of the other elements of the electronic device 1301.

The memory 1330 may include a volatile memory and/or a nonvolatile memory. The memory 1330 may store instructions or data related to at least one of the other elements of the electronic device 1301. According to an embodiment of the present disclosure, the memory 1330 may store software and/or a program 1340. The program 1340 may include, for example, a kernel 1341, a middleware 1343, an application programming interface (API) 1345, and/or an application program (or an application) 1347. At least a portion of the kernel 1341, the middleware 1343, or the API 1345 may be referred to as an operating system (OS).

The kernel 1341 may control or manage system resources (e.g., the bus 1310, the processor 1320, the memory 1330, or the like) used to perform operations or functions of other programs (e.g., the middleware 1343, the API 1345, or the application program 1347). Furthermore, the kernel 1341 may provide an interface for allowing the middleware 1343, the API 1345, or the application program 1347 to access individual elements of the electronic device 1301 in order to control or manage the system resources.

The middleware 1343 may serve as an intermediary so that the API 1345 or the application program 1347 communicates and exchanges data with the kernel 1341.

Furthermore, the middleware 1343 may handle one or more task requests received from the application program 1347 according to a priority order. For example, the middleware 1343 may assign at least one application program 1347 a priority for using the system resources (e.g., the bus 1310, the processor 1320, the memory 1330, or the like) of the electronic device 1301. For example, the middleware 1343 may handle the one or more task requests according to the priority assigned to the at least one application, thereby performing scheduling or load balancing with respect to the one or more task requests.

The API 1345, which is an interface for allowing the application 1347 to control a function provided by the kernel 1341 or the middleware 1343, may include, for example, at least one interface or function (e.g., instructions) for file control, window control, image processing, character control, or the like.

The input/output interface 1350 may serve to transfer an instruction or data input from a user or another external device to (an)other element(s) of the electronic device 1301. Furthermore, the input/output interface 1350 may output instructions or data received from (an)other element(s) of the electronic device 1301 to the user or another external device.

The display 1360 may include, for example, a liquid crystal display (LCD), a light-emitting diode (LED) display, an organic light-emitting diode (OLED) display, a microelectromechanical systems (MEMS) display, or an electronic paper display. The display 1360 may present various content (e.g., a text, an image, a video, an icon, a symbol, or the like) to the user. The display 1360 may include a touch screen, and may receive a touch, gesture, proximity or hovering input from an electronic pen or a part of a body of the user.

The communication interface 1370 may set communications between the electronic device 1301 and an external device (e.g., a first external electronic device 1302, a second external electronic device 1304, or a server 1306). For example, the communication interface 1370 may be connected to a network 1362 via wireless communications or wired communications so as to communicate with the external device (e.g., the second external electronic device 1304 or the server 1306).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1364. The short-range communications may include at least one of wireless fidelity (Wi-Fi), Bluetooth, near field communication (NFC), magnetic stripe transmission (MST), or GNSS.

The MST may generate a pulse by using electro-magnetic signals according to transmission data, and the pulse may cause magnetic signals. The electronic device 1301 may transmit the magnetic signals to a point of sales (POS). The POS may detect the magnetic signals using a MST reader and obtain the transmission data by converting the magnetic signals to electronic signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1362 may include at least one of telecommunications networks, for example, a computer network (e.g., local area network (LAN) or wide area network (WAN)), the Internet, or a telephone network.

The types of the first external electronic device 1302 and the second external electronic device 1304 may be the same as or different from the type of the electronic device 1301. According to an embodiment of the present disclosure, the server 1306 may include a group of one or more servers. A portion or all of operations performed in the electronic device 1301 may be performed in one or more other electronic devices (e.g., the first electronic device 1302, the second external electronic device 1304, or the server 1306). When the electronic device 1301 should perform a certain function or service automatically or in response to a request, the electronic device 1301 may request at least a portion of functions related to the function or service from another device (e.g., the first electronic device 1302, the second external electronic device 1304, or the server 1306) instead of or in addition to performing the function or service for itself. The other electronic device (e.g., the first electronic device 1302, the second external electronic device 1304, or the server 1306) may perform the requested function or additional function, and may transfer a result of the performance to the electronic device 1301. The electronic device 1301 may use a received result itself or additionally process the received result to provide the requested function or service. To this end, for example, a cloud computing technology, a distributed computing technology, or a client-server computing technology may be used.

Figure 14:
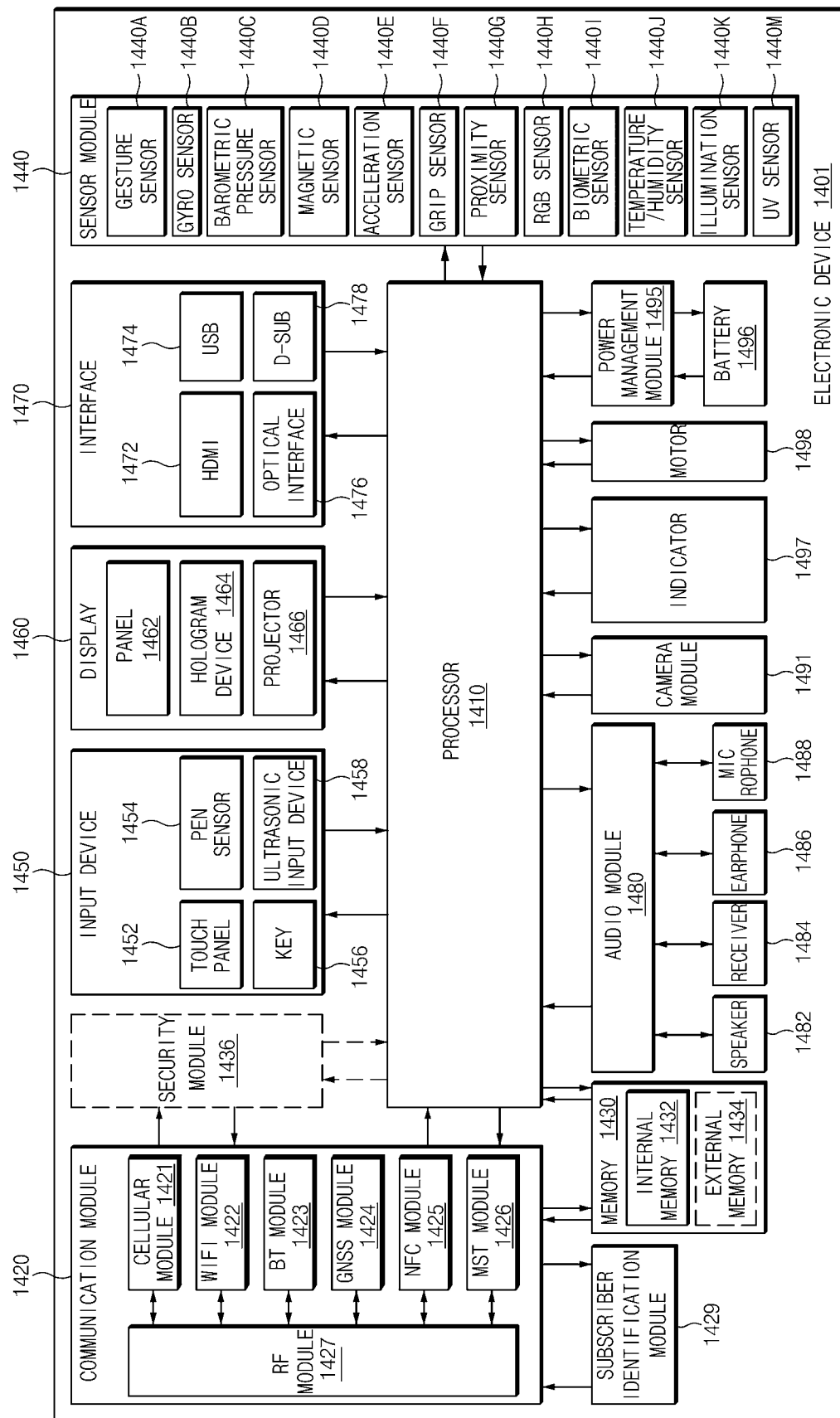
FIG. 14 is a block diagram illustrating a configuration of an electronic device according to various embodiments.

Referring to FIG. 14, the electronic device 1401 may include, for example, a part or the entirety of the UE 1300 illustrated in FIG. 13. The electronic device 1401 may include at least one processor (e.g., an AP) 1410, a communication module 1420, a subscriber identification module (SIM) 1429, a memory 1430, a sensor module 1440, an input device 1450, a display module 1460, an interface 1470, an audio module 1480, a camera module 1491, a power management module 1495, a battery 1496, an indicator 1497, and a motor 1498.

The processor 1410 may execute, or run, an operating system (OS) or an application program so as to control a plurality of hardware or software elements connected to the processor 1410, process various data, and perform operations. The processor 1410 may be implemented with, for example, an SoC. According to an embodiment of the present disclosure, the processor 1410 may further include a graphics processing unit (GPU) and/or an image signal processor. The processor 1410 may include at least a portion (e.g., a cellular module 1421) of the elements illustrated in FIG. 14. The processor 1410 may load, on a volatile memory, an instruction or data received from at least one of the other elements (e.g., a nonvolatile memory) to process the instruction or data, and may store various data in a nonvolatile memory.

The communication module 1420 may be configured the same as or similar to that of the communication circuit 1320 of FIG. 13. The communication module 1420 may include, for example, a cellular module 1421 (e.g., a modem), a WiFi module 1422, a Bluetooth module 1423, a global navigation satellite system (GNSS) module 1424 (e.g., a global positioning system (GPS) module, a global navigation satellite system (GLONASS) module, a BeiDou navigation satellite system module, or a Galileo global navigation satellite system module), a near field communication (NFC) module

1425, a magnetic secure transmission (MST) module 1426, and a radio frequency (RF) module 1427.

The cellular module 1421 may provide, for example, a voice call service, a video call service, a text message service, or an Internet service through a communication network. The cellular module 1421 may identify and authenticate the electronic device 1401 in the communication network using the SIM 1429 (e.g., a SIM card). The cellular module 1421 may perform at least a part of the functions that may be provided by the processor 1410. The cellular module 1421 may include a CP.

Each of the WiFi module 1422, the Bluetooth module 1423, the GNSS module 1424, the NFC module 1425, and the MST module 1426 may include, for example, a processor for processing data transmitted/received through the modules. According to an embodiment of the present disclosure, at least a part (e.g., two or more) of the cellular module 1421, the WiFi module 1422, the Bluetooth module 1423, the GNSS module 1424, the NFC module 1425, and the MST module 1426 may be included in a single integrated circuit (IC) or IC package.

The RF module 1427 may transmit/receive, for example, communication signals (e.g., RF signals). The RF module 1427 may include, for example, a transceiver, a power amplifier module (PAM), a frequency filter, a low noise amplifier (LNA), an antenna, or the like. According to an embodiment of the present disclosure, at least one of the cellular module 1421, the WiFi module 1422, the Bluetooth module 1423, the GNSS module 1424, the NFC module 1425, or the MST module 1426 may transmit/receive RF signals through a separate RF module.

The SIM 1429 may include, for example, an embedded SIM and/or a card containing the SIM, and may include unique identification information (e.g., an integrated circuit card identifier (ICCID)) or subscriber information (e.g., an international mobile subscriber identity (IMSI)).

The memory 1430 (e.g., the memory 1360 of FIG. 13) may include, for example, an internal memory 1432 or an external memory 1434. The internal memory 1432 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1434 may include a flash drive such as a compact flash (CF) drive, a secure digital (SD) drive, a micro-SD drive, a mini-SD drive, an extreme digital (xD) drive, a multi-media card (MMC), a memory stick, or the like. The external memory 1434 may be operatively and/or physically connected to the electronic device 1401 through various interfaces.

A security module 1436, which is a module including a storage space that is more secure (e.g. has a higher security level) than the memory 1430, may be a circuit for providing secure data storage and protected execution circumstances. The security module 1436 may be implemented with an additional circuit and may include an additional processor. The security module 1436 may be present in an attachable smart chip or SD card, or may include an embedded secure element (eSE), which is installed in a fixed chip. Additionally, the security module 1436 may be driven in another OS which is different from the OS of the electronic device 1401. For example, the security module 1436 may operate based on a java card open platform (JCOP) OS.

The sensor module 1440 may, for example, measure a physical quantity or detect an operation state of the electronic device 1401 so as to convert measured or detected information into an electrical signal. The sensor module 1440 may include, for example, at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G, a color sensor 1440H (e.g., a red/green/blue (RGB) sensor), a biometric sensor 1440I, a temperature/humidity sensor 1440J, an illumination sensor 1440K, or an ultraviolet (UV) light sensor 1440M. Additionally, or alternatively, the sensor module 1440 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1440 may further include a control circuit for controlling at least one sensor included therein. In an embodiment of the present disclosure, the electronic device 1401 may further include a processor configured to control the sensor module 1440 as a part of the processor 1410 or separately, so that the sensor module 1440 is controlled while the processor 1410 is in a reduced power, or sleep, state.

The input device 1450 may include, for example, a touch panel 1452, a (digital) pen sensor 1454, a key 1456, or an ultrasonic input device 1458. The touch panel 1452 may employ at least one of a capacitive method, a resistive method, an infrared method, and an ultraviolet light sensing method. The touch panel 1452 may further include a control circuit. The touch panel 1452 may further include a tactile layer so as to provide a haptic feedback to a user.

The (digital) pen sensor 1454 may include, for example, a sheet for recognition which is a part of a touch panel or is separate. The key 1456 may include, for example, a physical button, an optical button, or a keypad. The ultrasonic input device 1458 may sense ultrasonic waves generated by an input tool through a microphone 1488 so as to identify data corresponding to the ultrasonic waves sensed.

The display module 1460 (e.g., the display 1370 of FIG. 13) may include a panel 1462, a hologram device 1464, or a projector 1466. The panel 1462 may be configured the same as or similar to that of the display 1370 of FIG. 13. The panel 1462 may be, for example, flexible, transparent, or wearable. The panel 1462 and the touch panel 1452 may be integrated into a single module. The hologram device 1464 may display a stereoscopic image in a space using a light interference phenomenon. The projector 1466 may project light onto a screen so as to display an image. The screen may be disposed internally or externally to the electronic device 1401. According to an embodiment of the present disclosure, the display module 1460 may further include a control circuit for controlling the panel 1462, the hologram device 1464, or the projector 1466.

The interface 1470 may include, for example, a high definition multimedia interface (HDMI) 1472, a universal serial bus (USB) 1474, an optical interface 1476, or a D-subminiature (D-sub) connector 1478. The interface 1470, for example, may be included in the communication circuit 1320 of FIG. 13. Additionally, or alternatively, the interface 1470 may include, for example, a mobile high-definition link (MHL) interface, an SD/MMC interface, or an Infrared Data Association (IrDA) interface.

The audio module 1480 may convert, for example, a sound into an electrical signal or vice versa. The audio module 1480 may process sound information input or output through a speaker 1482, a receiver 1484, an earphone 1486, or the microphone 1488.

The camera module 1491 is, for example, a device for taking a still image or a video. According to an embodiment of the present disclosure, the camera module 1491 may include at least one image sensor (e.g., a front sensor or a rear sensor), a lens, an image signal processor (ISP), or a flash (e.g., a light emitting diode (LED) or a xenon lamp).

The power management module 1495 may manage power of the electronic device 1401. According to an embodiment of the present disclosure, the power management module 1495 may include a power management integrated circuit (PMIC), a charger IC, a battery, or a battery gauge. The PMIC may employ a wired and/or a wireless charging method. A wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1496 and a voltage, current, or temperature thereof while the battery is charged. The battery 1496 may include, for example, a rechargeable battery and/or a solar battery.

The indicator 1497 may display a certain state of the electronic device 1401 or a part thereof (e.g., the processor 1410), such as a booting state, a message state, a charging state, or the like. The motor 1498 may convert an electrical signal into a mechanical vibration, and may generate a vibration or a haptic effect. A processing device (e.g., a GPU) for supporting mobile TV may be included in the electronic device 1401. The processing device for supporting mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 15:
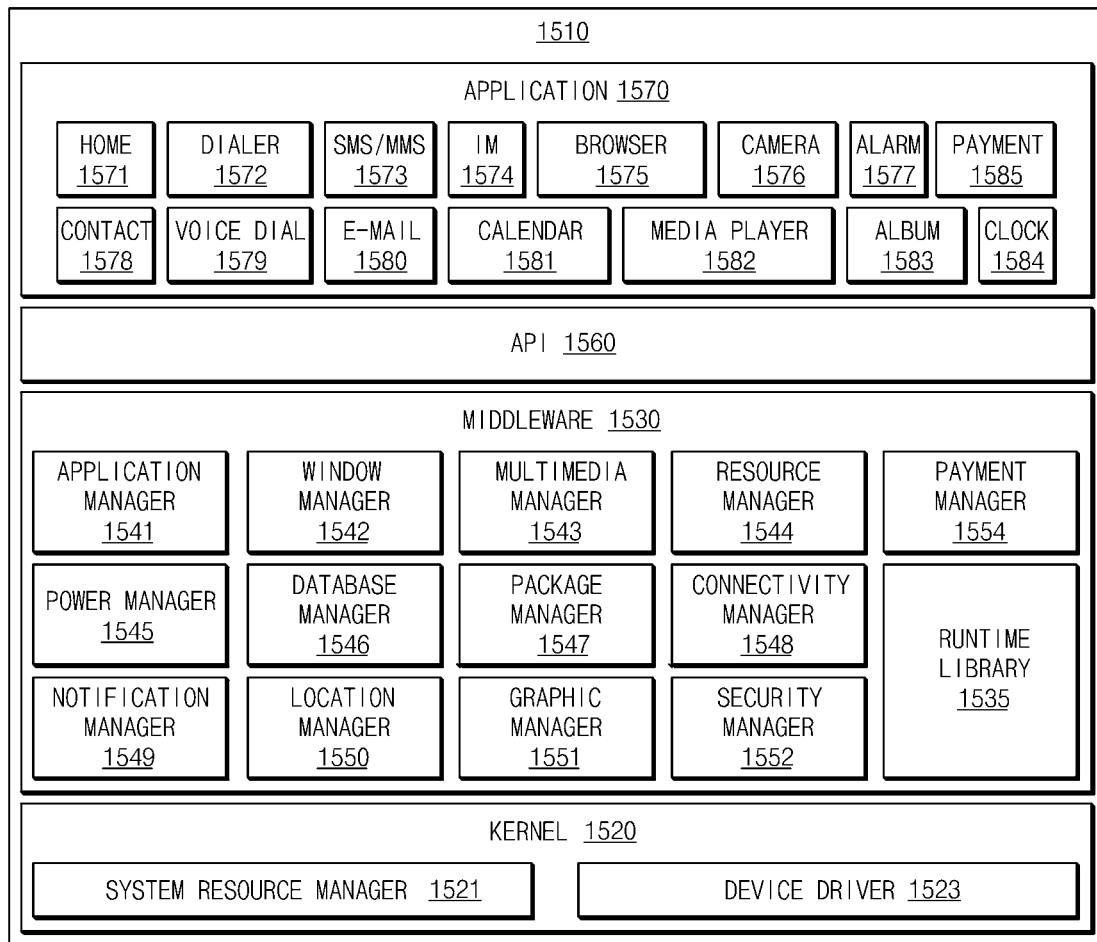
FIG. 15 is a block diagram illustrating a program module according to an embodiment of the present disclosure.

FIG. 15 is a block diagram illustrating a program module according to an embodiment of the present disclosure.

Referring to FIG. 15, a program module 1510 (e.g., the program 1340) may include an operating system (OS) for controlling a resource related to an electronic device (e.g., the electronic device 1301) and/or various applications (e.g., the application program 1347) running on the OS. The operating system may be, for example, Android, iOS, Windows, Symbian, Tizen, or the like.

The program module 1510 may include a kernel 1520, a middleware 1530, an API 1560, and/or an application 1570. At least a part of the program module 1510 may be pre-loaded on an electronic device or may be downloaded from an external electronic device (e.g., the first electronic device 1302, the second external electronic device 1304, or the server 1306).

The kernel 1520 (e.g., the kernel 1341) may include, for example, a system resource manager 1521 or a device driver 1523. The system resource manager 1521 may perform control, allocation, or retrieval of a system resource. According to an embodiment of the present disclosure, the system resource manager 1521 may include a process management unit, a memory management unit, a file system management unit, or the like. The device driver 1523 may include, for example, a display driver, a camera driver, a Bluetooth driver, a shared memory driver, a USB driver, a keypad driver, a Wi-Fi driver, an audio driver, or an inter-process communication (IPC) driver.

The middleware 1530, for example, may provide a function that the applications 1570 require in common, or may provide various functions to the applications 1570 through the API 1560 so that the applications 1570 may efficiently use limited system resources in the electronic device. According to an embodiment of the present disclosure, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, a security manager 1552, and a payment manager 1554.

The runtime library 1535 may include, for example, a library module that a complier uses to add a new function through a programming language while the application 1570 is running. The runtime library 1535 may perform a function for input/output management, memory management, or an arithmetic function.

The application manager 1541 may mange, for example, a life cycle of at least one of the applications 1570. The window manager 1542 may manage a GUI resource used in a screen. The multimedia manager 1543 may recognize a format required for playing various media files and may encode or decode a media file using a codec matched to the format. The resource manager 1544 may manage a resource such as a source code, a memory, or a storage space of at least one of the applications 1570.

The power manager 1545, for example, may operate together with a basic input/output system (BIOS) to manage a battery or power and may provide power information required for operating the electronic device. The database manager 1546 may generate, search, or modify a database to be used in at least one of the applications 1570. The package manager 1547 may manage installation or update of an application distributed in a package file format.

The connectivity manger 1548 may manage wireless connection of Wi-Fi, Bluetooth, or the like. The notification manager 1549 may display or notify an event such as message arrival, appointments, and proximity alerts in such a manner as not to disturb a user. The location manager 1550 may manage location information of the electronic device. The graphic manager 1551 may manage a graphic effect to be provided to a user or a user interface related thereto. The security manager 1552 may provide various security functions required for system security or user authentication. According to an embodiment of the present disclosure, in the case in which an electronic device (e.g., the electronic device 1301) includes a phone function, the middleware 1530 may further include a telephony manager for managing a voice or video call function of the electronic device.

The middleware 1530 may include a middleware module for forming a combination of various functions of the above-mentioned elements. The middleware 1530 may provide a module specialized for each type of an operating system to provide differentiated functions. Furthermore, the middleware 1530 may delete a part of existing elements or may add new elements dynamically.

The API 1560 (e.g., the API 1345) which is, for example, a set of API programming functions may be provided in different configurations according to an operating system. For example, in the case of Android or iOS, one API set may be provided for each platform, and, in the case of Tizen, at least two API sets may be provided for each platform.

The application 1570 (e.g., the application program 1347), for example, may include at least one application capable of performing functions such as a home 1571, a dialer 1572, an SMS/MMS 1573, an instant message (IM) 1574, a browser 1575, a camera 1576, an alarm 1577, a contact 1578, a voice dial 1579, an e-mail 1580, a calendar 1581, a media player 1582, an album 1583, a clock 1584, health care (e.g., measure an exercise amount or blood sugar), or environmental information provision (e.g., provide air pressure, humidity, or temperature information).

According to an embodiment of the present disclosure, the application 1570 may include an information exchange application for supporting information exchange between the electronic device (e.g., the electronic device 1301) and an external electronic device (e.g., the first electronic device 1302 or the second external electronic device 1304). The information exchange application may include, for example, a notification relay application for relaying specific information to the external electronic device or a device management application for managing the external electronic device.

For example, the notification relay application may have a function for relaying, to an external electronic device (e.g., the first electronic device 1302 or the second external electronic device 1304), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1302 or the second external electronic device 1304) communicating with the electronic device, an application running in the external electronic device, or a service (e.g., a call service, a message service, or the like) provided from the external electronic device.

According to an embodiment of the present disclosure, the application 1570 may include a specified application (e.g., a healthcare application of a mobile medical device) according to an attribute of the external electronic device (e.g., the first electronic device 1302 or the second external electronic device 1304). The application 1570 may include an application received from an external electronic device (e.g., the first electronic device 1302 or the second external electronic device 1304). The application 1570 may include a preloaded application or a third-party application downloadable from a server. The names of the elements of the program module 1510 illustrated may vary with the type of an operating system.

According to various embodiments of the present disclosure, at least a part of the program module 1510 may be implemented with software, firmware, hardware, or a combination thereof. At least a part of the program module 1510, for example, may be implemented (e.g., executed) by a processor (e.g., the processor 1410). At least a part of the program module 1510 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1320), the processor may perform functions corresponding to the instructions. The computer-readable storage medium may be, for example, the memory 1330.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that may be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to embodiments disclosed in the present disclosure, the user terminal may increase Rx performance or may reduce power consumption, based on a communication environment of the user terminal.

Further, according to an embodiment, the user terminal may continue receiving a signal via the at least two best antennas with good Rx efficiency.

Further, according to an embodiment, the user terminal may considerably reduce a probability that a call drop will occur upon a VoLTE call.

Further, according to an embodiment, the user terminal may maintain a data throughput at a high state upon a data download.

Further, according to an embodiment, the user terminal may stably receive a paging signal in an RRC idle state.

In addition, the user terminal may provide various effects directly or indirectly ascertained through the present disclosure.

Although the present disclosure has been described with an example embodiment, various changes and modifications may be suggested to one skilled in the art. It is intended that the present disclosure encompass such changes and modifications as fall within the scope of the appended claims.

What is claimed is:

1. A portable communication device, comprising:
a plurality of antennas;
a radio frequency (RF) circuit electrically connected with the plurality of antennas; and
a processor operatively connected to the RF circuit, wherein the processor is configured to:
control the RF circuit to operate in a first mode to receive a signal corresponding to a first frequency band using a first set of the plurality of antennas, while the signal is received, determine control information associated with downlink data for the portable communication device, and
control the RF circuit to operate in a second mode to receive the signal using a second set of the plurality of antennas different from the first set of the plurality of antennas based at least in part on a determination that the control information satisfies a specified condition.

2. The portable communication device of claim 1, wherein the processor is configured to:
control the RF circuit to operate in the first mode using the first set of the plurality of antennas in association with a voice over long-term evolution (VoLTE) service.

3. The portable communication device of claim 1, wherein the processor is configured to:
set the first set of the plurality of antennas and the second set of the plurality of antennas such that a first number of antennas in the first set of the plurality of antennas is greater than a second number of antennas in the second set of the plurality of antennas.

4. The portable communication device of claim 1, wherein the processor is configured to:
set the first set of the plurality of antennas and the second set of the plurality of antennas such that a first number of antennas in the first set of the plurality of antennas is smaller than a second number of antennas in the second set of the plurality of antennas.

5. The portable communication device of claim 1, wherein the processor is configured to:
set the first set of the plurality of antennas and the second set of the plurality of antennas such that a first number of antennas in the first set of the plurality of antennas is equal to a second number of antennas in the second set of the plurality of antennas.

6. The portable communication device of claim 1, wherein the processor is configured to:
control the RF circuit to operate in the second mode using the second set of the plurality of antennas further based on an radio resource control (RRC) state.

7. The portable communication device of claim 1, wherein the plurality of antennas include a first main antenna, a first sub-antenna, a second main antenna and a second sub-antenna, each of the first main antenna and second main antenna configured to receive and to send the signal and each of the first sub-antenna and second sub-antenna configured to receive and not send the signal.

8. The portable communication device of claim 7, wherein the first sub-antenna is configured to be used to receive the signal when the first main antenna is used to receive the signal, and not to be used to receive the signal when the first main antenna is not used to receive the signal, and the second sub-antenna is configured to be used to receive the signal when the second main antenna is used to receive the signal, and not to be used to receive the signal when the second main antenna is not used to receive the signal.

9. A portable communication device, comprising:
four antennas;
a radio frequency (RF) circuit electrically connected with the four antennas; and
a processor operatively connected to the RF circuit, wherein the processor is configured to:
control the RF circuit to operate in a first mode to receive a signal corresponding to a first frequency band using two antennas among the four antennas, while the signal is received, determine a parameter indicating signal strength or signal quality,
control the RF circuit to operate in a second mode to receive the signal using the four antennas at least in part on a determination that the parameter satisfies a specific condition.

10. The portable communication device of claim 9, wherein the processor is configured to control the RF circuit to operate in the first mode if the parameter is equal to or greater than a first threshold.

11. The portable communication device of claim 9, wherein the processor is configured to control the RF circuit based on control information associated with downlink data for the portable communication device if the parameter is less than a first threshold and equal to or greater than a second threshold.

12. The portable communication device of claim 11, wherein the control information includes downlink control information in a physical downlink control channel (PDCCH).

13. The portable communication device of claim 12, whether the processor is configured to, when a signal state is less than the first threshold and equal to or greater than the second threshold:
control the RF circuit to operate in the second mode, if a rate of data to be received during a unit time based on the control information is greater than a first threshold value, and
control the RF circuit to operate in the first mode, if a rate of data to be received during a unit time based on the control information is less than or equal to the first threshold value.

14. The portable communication device of claim 9, wherein the parameter corresponds to at least one of a reference signal received power (RSRP), an energy to interference ratio (ECIO), a reference signal received quality (RSRQ), or a signal to interference plus noise ratio (SINR).

15. The portable communication device of claim 11, wherein the processor is configured to control the RF circuit to operate in the second mode if the parameter is less than the second threshold.

16. A portable communication device, comprising:
a plurality of antennas;
a radio frequency (RF) circuit electrically connected with the plurality of antennas; and a processor operatively connected to the RF circuit, wherein the processor is configured to:
    perform a voice over long-term evolution (VoLTE) call using the RF circuit,
    while performing the VoLTE call, determine a signal state associated with a parameter indicating signal strength or signal quality,
    control the RF circuit to operate in a first mode to receive a signal with a first set of the plurality of antennas or in a second mode to receive the signal with a second set of the plurality of antennas based at least in part on the signal state, and
    wherein the second set of the plurality of antennas is different from the first set of the plurality of antennas.

17. The portable communication device of claim 16, wherein the processor is configured to:
    control the RF circuit to operate in the first mode when the signal state is same to or greater than a threshold, and
    control the RF circuit to operate in the second mode when the signal state is less than the threshold.

18. The portable communication device of claim 17, wherein the parameter corresponds to at least one of a reference signal received power (RSRP), an energy to interference ratio (ECIO), a reference signal received quality (RSRQ), or a signal to interference plus noise ratio (SINR).

19. The portable communication device of claim 16, wherein the processor is configured to control the RF circuit to operate in the first mode after the VoLTE call is terminated.

20. The portable communication device of claim 16, wherein a second number of antennas in the second set of the plurality of antennas is equal to or greater than a first number of antennas in the first set of the plurality of antennas.

* * * * *